(12) United States Patent
Wang et al.

(10) Patent No.: US 10,149,285 B2
(45) Date of Patent: Dec. 4, 2018

(54) RESOURCE ALLOCATION METHOD AND USER EQUIPMENT

(71) Applicant: HUAWEI DEVICE (DONGGUAN) CO., LTD., Dongguan (CN)

(72) Inventors: Jian Wang, Beijing (CN); Liang Xia, Shenzhen (CN); Kai Xu, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 135 days.

(21) Appl. No.: 15/221,460

(22) Filed: Jul. 27, 2016

(65) Prior Publication Data

US 2016/0338042 A1 Nov. 17, 2016

Related U.S. Application Data

(63) Continuation of application No. PCT/CN2014/071692, filed on Jan. 28, 2014.

(51) Int. Cl.
*H04W 72/04* (2009.01)
*H04L 5/00* (2006.01)
*H04W 56/00* (2009.01)

(52) U.S. Cl.
CPC ....... *H04W 72/0413* (2013.01); *H04L 5/0005* (2013.01); *H04W 56/0015* (2013.01); *H04W 72/0406* (2013.01); *H04W 72/0446* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 2002/0134833 A1* | 9/2002 | Degrauwe | G06K 7/0008 235/382 |
| 2007/0286111 A1 | 12/2007 | Corson et al. | |
| 2011/0255450 A1 | 10/2011 | Wang et al. | |
| 2012/0106502 A1 | 5/2012 | Goldhamer | |
| 2012/0309306 A1 | 12/2012 | Kim et al. | |
| 2013/0150061 A1 | 6/2013 | Shin et al. | |
| 2013/0308549 A1* | 11/2013 | Madan | H04W 28/26 370/329 |

FOREIGN PATENT DOCUMENTS

| | | | | |
|---|---|---|---|---|
| CN | 102547871 A | 7/2012 | | |
| CN | 103828398 A | 5/2014 | | |
| EP | 1035667 A2 * | 9/2000 | .......... | H04B 7/2125 |
| EP | 1035667 A2 * | 9/2000 | .......... | H04B 7/2125 |

(Continued)

*Primary Examiner* — Ayanah S George

(57) ABSTRACT

The present invention discloses a resource allocation method and user equipment, where the method includes: determining, by first user equipment, a first resource; and sending, by the first user equipment, at least one occupation signal on the first resource, where the at least one occupation signal is used to indicate occupation of the first resource. According to the resource allocation method and the user equipment in embodiments of the present invention, an occupation signal is sent on a selected to-be-occupied resource to indicate occupation of the resource, so as to effectively avoid resource contention between different user equipment or between different user groups and effectively improve user experience.

16 Claims, 7 Drawing Sheets

(56) References Cited

FOREIGN PATENT DOCUMENTS

| | | | |
|---|---|---|---|
| EP | 2405683 | A1 | 1/2012 |
| EP | 3001631 | A1 | 3/2016 |
| JP | 2006303590 | A | 11/2006 |
| JP | 2012016036 | A | 1/2012 |
| JP | 2013530570 | A | 7/2013 |
| WO | 2012/159270 | A1 | 11/2012 |
| WO | 2013/038056 | A1 | 3/2013 |

* cited by examiner

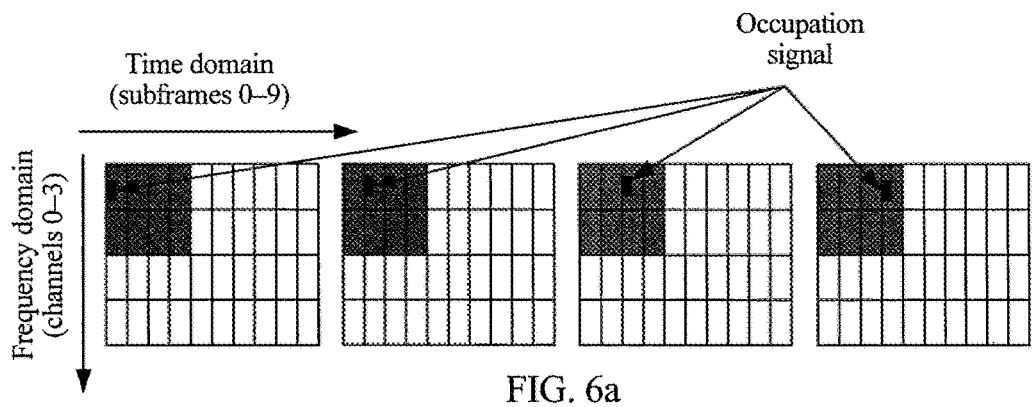
FIG. 6a
FIG. 6b
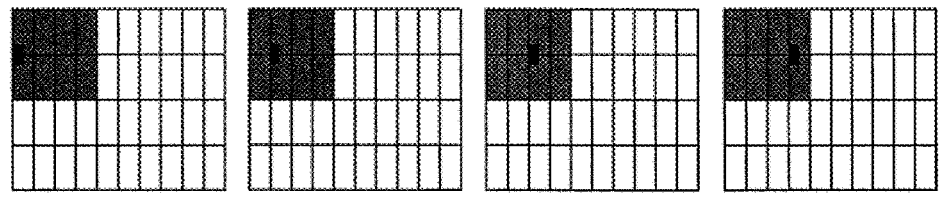
FIG. 7

RESOURCE ALLOCATION METHOD AND USER EQUIPMENT

CROSS-REFERENCE TO RELATED APPLICATIONS

This application is a continuation of International Application No. PCT/CN2014/071692, filed on Jan. 28, 2014, which is hereby incorporated by reference in its entirety.

TECHNICAL FIELD

The present invention relates to the field of mobile communications, and in particular, to a resource allocation method and user equipment in the field of mobile communications.

BACKGROUND

Device-to-device (English: Device-to-Device, D2D for short) communication refers to direct communication between user equipment. A device-to-device proximity service (English: Device to Device Proximity Service, D2D ProSe for short) has become a research subject in a Rel.12 system in a Long Term Evolution (English: Long Term Evolution, LTE for short) system in the 3rd Generation Partnership Project (English: 3rd Generation Partnership Project, 3GPP for short), and D2D communication is supported since the Rel.12 system.

In a D2D direct-connection communication scenario, multiple users form a user group (Group) or a user cluster (Cluster). Within a group or cluster, multiple users share specific time and frequency resources. In a D2D ProSe scenario, multiple user groups may coexist. In this case, to avoid interference between different user equipment or between different user groups, resource allocation needs to be coordinated between different user groups.

In a general commercial communications system, resources used by the communications system are planned in advance, and are free from a temporary contention problem. For example, in a WiFi network, a user may manually select a frequency channel used by the network, or may use an automatic selection manner in which the system performs energy detection and selects a frequency channel with relatively low interference. Once a frequency channel is selected, the user uses a contention access manner.

An existing resource allocation technology cannot be directly applied to the D2D direct-connection communication scenario, specifically, for example, a broadcast communication scenario without control from a central node in D2D direct-connection communication design, because user equipment with a higher access channel priority exists in the broadcast communication scenario of D2D direct-connection communication. If the existing resource allocation technology such as a CSMA access method is applied, user equipment have a same access priority, and therefore, high-privilege user equipment or user equipment of a higher service priority cannot be given access precedence.

The existing resource allocation technology does not allow flexible allocation and contention in a time domain, and cannot be directly applied to an LTE-based D2D direct-connection communications system.

SUMMARY

Embodiments of the present invention provide a resource allocation method and user equipment, and can effectively avoid resource contention between different user equipment or between different user groups and effectively improve user experience.

According to a first aspect, a resource allocation method is provided, where the method includes: determining, by first user equipment, a first resource; and sending, by the first user equipment, at least one occupation signal on the first resource, where the at least one occupation signal is used to indicate occupation of the first resource.

With reference to the first aspect, in a first possible implementation manner of the first aspect, the first resource includes n time-frequency resources, the n time-frequency resources are respectively located in n data frames of m data frames, n and m are positive integers, and n is not greater than m; and the sending, by the first user equipment, at least one occupation signal on the first resource includes: sending, by the first user equipment, the occupation signal on each data frame of k data frames of the n data frames, where the occupation signal is used to indicate a time-frequency resource occupied in a data frame that carries the occupation signal, k is a positive integer, and k is not greater than n.

With reference to the first possible implementation manner of the first aspect, in a second possible implementation manner of the first aspect, k is equal to n.

With reference to the first possible implementation manner of the first aspect, in a third possible implementation manner of the first aspect, when subframe occupation patterns, of the n time-frequency resources, in a data frame corresponding to each of the n time-frequency resources are the same, and when the m data frames are divided into f periods according to a same data frame occupation pattern, k is a quantity of data frames occupied in each period of the f periods, where f is a positive integer and a product of k and f is equal to n; and the sending, by the first user equipment, the occupation signal on each data frame of k data frames of the n data frames includes: sending, by the first user equipment, the occupation signal on each data frame of the k data frames occupied in the first period of the f periods.

With reference to the third possible implementation manner of the first aspect, in a fourth possible implementation manner of the first aspect, the occupation signal is further used to indicate a quantity of data frames included in each period of the f periods.

With reference to the first aspect, in a fifth possible implementation manner of the first aspect, the first resource includes n time-frequency resources, the n time-frequency resources are respectively located in n data frames of m data frames, n and m are positive integers, n is not greater than m, the at least one occupation signal includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel, t and s are positive integers, t is less than or equal to n, and s is less than or equal to t; and the sending, by the first user equipment, at least one occupation signal on the first resource includes: sending, by the first user equipment, the synchronization signal on each data frame of t data frames of the n data frames; and sending, by the first user equipment, the synchronization channel on at least the first data frame of data frames that carry the synchronization signal.

With reference to the fifth possible implementation manner of the first aspect, in a sixth possible implementation manner of the first aspect, the sending, by the first user equipment, the synchronization channel on at least the first data frame of the t data frames includes: sending, by the first user equipment, the synchronization channel on each data frame in the data frames that carry the synchronization signal.

With reference to the fifth or sixth possible implementation manner of the first aspect, in a seventh possible implementation manner of the first aspect, t is equal to n.

With reference to the fifth possible implementation manner of the first aspect, in an eighth possible implementation manner of the first aspect, when subframe occupation patterns, of the n time-frequency resources, in a data frame corresponding to each of the n time-frequency resources are the same, and when the m data frames are divided into f periods according to a same data frame occupation pattern, t is a quantity of data frames occupied in each period of the f periods, where f is a positive integer and a product of t and f is equal to n; and the sending, by the first user equipment, the synchronization signal on each data frame of t data frames of the n data frames includes: sending, by the first user equipment, the synchronization signal on each data frame of the t data frames occupied in the first period of the f periods.

With reference to the eighth possible implementation manner of the first aspect, in a ninth possible implementation manner of the first aspect, the synchronization signal is further used to indicate a quantity of data frames included in each period of the f periods.

With reference to the first aspect, in a tenth possible implementation manner of the first aspect, the first resource includes n time-frequency resources, the n time-frequency resources are respectively located in n data frames of m data frames, n and m are positive integers, n is not greater than m, subframe occupation patterns, of the n time-frequency resources, in a data frame corresponding to each of the n time-frequency resources are the same, the subframe occupation pattern corresponds to r subframes in one data frame, the at least one occupation signal includes t first signals and s second signals, each of the first signals is used to indicate that a data frame that carries the first signal is occupied, each of the second signals is used to indicate that a subframe that carries the second signal is occupied, r, t and s are positive integers, and t is less than or equal to n; and the sending, by the first user equipment, at least one occupation signal on the first resource includes: sending, by the first user equipment, the first signal on each data frame of t data frames of the n data frames; and sending, by the first user equipment, the second signal on each subframe of the r subframes in at least the first data frame of data frames that carry the first signal.

With reference to the tenth possible implementation manner of the first aspect, in an eleventh possible implementation manner of the first aspect, t is equal to n.

With reference to the tenth possible implementation manner of the first aspect, in a twelfth possible implementation manner of the first aspect, when the m data frames are divided into f periods according to a same data frame occupation pattern, t is a quantity of data frames occupied in each period of the f periods, where f is a positive integer and a product of t and f is equal to n; and the sending, by the first user equipment, the first signal on each data frame of t data frames of the n data frames includes: sending, by the first user equipment, the first signal on each data frame of the t data frames occupied in the first period of the f periods.

With reference to the twelfth possible implementation manner of the first aspect, in a thirteenth possible implementation manner of the first aspect, the first signal is further used to indicate a quantity of data frames included in each period of the f periods.

With reference to the first aspect, in a fourteenth possible implementation manner of the first aspect, the first resource includes g time-frequency resources that are respectively located in g consecutive data frames, subframe occupation patterns, of the g time-frequency resources, in a data frame corresponding to each of the g time-frequency resources are the same, the subframe occupation pattern corresponds to the $j^{th}$ subframe to the $(j+g-1)^{th}$ subframe in one data frame, and j and g are positive integers; and the sending, by the first user equipment, at least one occupation signal on the first resource includes: sending the occupation signal on the $(j+k-1)^{th}$ subframe in the $k^{th}$ data frame in the g data frames, where k is any one of $1, \ldots, g$, and the occupation signal is used to indicate that a subframe that carries the occupation signal is occupied.

According to a second aspect, a resource allocation method is provided, where the method includes: detecting, by second user equipment, at least one occupation signal, where the at least one occupation signal is used to indicate occupation of a first resource; and determining, by the second user equipment, the occupied first resource according to the at least one occupation signal.

With reference to the second aspect, in a first possible implementation manner of the second aspect, the detecting, by second user equipment, at least one occupation signal includes: detecting, by the second user equipment, the occupation signal on each data frame of k data frames, where the occupation signal is used to indicate a time-frequency resource occupied in a data frame that carries the occupation signal, and k is a positive integer; and the determining, by the second user equipment, the occupied first resource according to the at least one occupation signal includes: determining, by the second user equipment, at least a first time-frequency resource in each data frame of the k data frames that carry the occupation signal as the occupied first resource, where the first time-frequency resource is a time-frequency resource occupied in a data frame and indicated by the occupation signal.

With reference to the first possible implementation manner of the second aspect, in a second possible implementation manner of the second aspect, the determining, by the second user equipment, at least a first time-frequency resource in each data frame of the k data frames that carry the occupation signal as the occupied first resource includes: determining, by the second user equipment, the first time-frequency resource in each data frame of the following data frames as the occupied first resource: the k data frames that carry the occupation signal, and the $(p \times i)^{th}$ data frame after each data frame of the k data frames, where p is a data frame period, p is a positive integer, i is any one of $1, 2, \ldots, g$, and g is a positive integer.

With reference to the second possible implementation manner of the second aspect, in a third possible implementation manner of the second aspect, the occupation signal is further used to indicate the data frame period p.

With reference to the second aspect, in a fourth possible implementation manner of the second aspect, the at least one occupation signal includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel, and t and s are positive integers; and the detecting, by second user equipment, at least one occupation signal includes: detecting, by the second user equipment, the synchronization signal on each data frame of k data frames, where k is a positive integer; and detecting, by the second user equipment, the synchronization channel on at least the first data frame of data frames that carry the synchronization signal; and the determining, by the second user equipment, the occupied first resource according to the at least one occupation signal includes: determining, by the second user equipment, at least a first time-frequency resource in each data frame of the k data frames that carry the synchronization signal as the occupied first resource, where the first time-frequency resource is a time-frequency resource occupied in a data frame and indicated by the synchronization channel.

With reference to the fourth possible implementation manner of the second aspect, in a fifth possible implementation manner of the second aspect, the determining, by the second user equipment, at least a first time-frequency resource in each data frame of the k data frames that carry the synchronization signal as the occupied first resource includes: determining, by the second user equipment, the first time-frequency resource in each data frame of the following data frames as the occupied first resource: the k data frames that carry the synchronization signal, and the $(p \times i)^{th}$ data frame after each data frame of the k data frames, where p is a data frame period, p is a positive integer, i is any one of 1, 2, . . . , g, and g is a positive integer.

With reference to the fifth possible implementation manner of the second aspect, in a sixth possible implementation manner of the second aspect, the synchronization signal is further used to indicate the data frame period p.

With reference to the second aspect, in a seventh possible implementation manner of the second aspect, the at least one occupation signal includes t first signals and s second signals, each of the first signals is used to indicate that a data frame that carries the first signal is occupied, and each of the second signals is used to indicate that a subframe that carries the second signal is occupied, where t and s are positive integers; and the detecting, by second user equipment, at least one occupation signal includes: detecting, by the second user equipment, the first signal on each data frame of k data frames, where k is a positive integer; and detecting, by the second user equipment, the second signal on each subframe of r subframes in at least the first data frame in the k data frames that carry the first signal, where r is a positive integer; and the determining, by the second user equipment, the occupied first resource according to the at least one occupation signal includes: determining, by the second user equipment, at least a first time-frequency resource in each data frame of the k data frames that carry the first signal as the occupied first resource, where the first time-frequency resource is a time-frequency resource corresponding to the r subframes that carry the second signals in one data frame.

With reference to the seventh possible implementation manner of the second aspect, in an eighth possible implementation manner of the second aspect, the determining, by the second user equipment, at least a first time-frequency resource in each data frame of the k data frames that carry the first signal as the occupied first resource includes: determining, by the second user equipment, the first time-frequency resource in each data frame of the following data frames as the occupied first resource: the k data frames that carry the first signal, and the $(p \times i)^{th}$ data frame after each data frame of the k data frames, where p is a data frame period, p is a positive integer, i is any one of 1, 2, . . . , g, and g is a positive integer.

With reference to the eighth possible implementation manner of the second aspect, in a ninth possible implementation manner of the second aspect, the first signal is further used to indicate the data frame period p.

With reference to the second aspect, in a tenth possible implementation manner of the second aspect, the detecting, by second user equipment, at least one occupation signal includes: detecting, by the second user equipment, the occupation signal on the $(j+k-1)^{th}$ subframe in the $k^{th}$ data frame in g consecutive data frames, where the occupation signal is used to indicate that a subframe that carries the occupation signal is occupied, g and j are positive integers, and k is any one of 1, . . . , g; and the determining, by the second user equipment, the occupied first resource according to the at least one occupation signal includes: determining, by the second user equipment, at least a first time-frequency resource in each data frame of the g data frames as the occupied first resource, where the first time-frequency resource is a time-frequency resource corresponding to the $j^{th}$ subframe to the $(j+g-1)^{th}$ subframe in one data frame.

According to a third aspect, user equipment is provided, where the user equipment includes: a determining module, configured to determine a first resource; and a sending module, configured to send at least one occupation signal on the first resource determined by the determining module, where the at least one occupation signal is used to indicate occupation of the first resource.

With reference to the third aspect, in a first possible implementation manner of the third aspect, the first resource determined by the determining module includes n time-frequency resources, the n time-frequency resources are respectively located in n data frames of m data frames, n and m are positive integers, and n is not greater than m; and the sending module is specifically configured to send the occupation signal on each data frame of k data frames of the n data frames, where the occupation signal is used to indicate a time-frequency resource occupied in a data frame that carries the occupation signal, k is a positive integer, and k is not greater than n.

With reference to the first possible implementation manner of the third aspect, in a second possible implementation manner of the third aspect, the sending module is specifically configured to send the occupation signal on each data frame of k data frames of the n data frames, where k is equal to n.

With reference to the first possible implementation manner of the third aspect, in a third possible implementation manner of the third aspect, subframe occupation patterns, of the n time-frequency resources included in the first resource determined by the determining module, in a data frame corresponding to each of the n time-frequency resources are the same, and the m data frames are divided into f periods according to a same data frame occupation pattern, where k is a quantity of data frames occupied in each period of the f periods, f is a positive integer, and a product of k and f is equal to n;

the sending module is specifically configured to send the occupation signal on each data frame of the k data frames of the n data frames, where the k data frames are k data frames occupied in the first period of the f periods.

With reference to the third possible implementation manner of the third aspect, in a fourth possible implementation manner of the third aspect, the occupation signal sent by the sending module is further used to indicate a quantity of data frames included in each period of the f periods.

With reference to the third aspect, in a fifth possible implementation manner of the third aspect, the first resource determined by the determining module includes n time-frequency resources, the n time-frequency resources are respectively located in n data frames of m data frames, n and m are positive integers, n is not greater than m, the at least one occupation signal sent by the sending module includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel, t and s are positive integers, t is less than or equal to n, and s is less than or equal to t; and the sending module is specifically configured to send the synchronization signal on each data frame of t data frames of the n data frames, and send the synchronization channel on at least the first data frame of the data frames that carry the synchronization signal.

With reference to the fifth possible implementation manner of the third aspect, in a sixth possible implementation manner of the third aspect, the sending module is specifically configured to send the synchronization signal on each data frame of the t data frames of the n data frames, and send the synchronization channel on each data frame of the data frames that carry the synchronization signal, where t is equal to n.

With reference to the fifth possible implementation manner of the third aspect, in a seventh possible implementation manner of the third aspect, subframe occupation patterns, of the n time-frequency resources determined by the determining module, in a data frame corresponding to each of the n time-frequency resources are the same, and the m data frames are divided into f periods according to a same data frame occupation pattern, where t is a quantity of data frames occupied in each period of the f periods, f is a positive integer, and a product of t and f is equal to n;

the sending module is specifically configured to send the synchronization signal on each data frame of the k data frames of the n data frames, where the k data frames are k data frames occupied in the first period of the f periods.

With reference to the seventh possible implementation manner of the third aspect, in an eighth possible implementation manner of the third aspect, the synchronization signal sent by the sending module is further used to indicate a quantity of data frames included in each period of the f periods.

With reference to the third aspect, in a ninth possible implementation manner of the third aspect, the first resource determined by the determining module includes n time-frequency resources, the n time-frequency resources are respectively located in n data frames of m data frames, n and m are positive integers, n is not greater than m, subframe occupation patterns, of the n time-frequency resources, in a data frame corresponding to each of the n time-frequency resources are the same, the subframe occupation pattern corresponds to r subframes in one data frame, the at least one occupation signal includes t first signals and s second signals, each of the first signals is used to indicate that a data frame that carries the first signal is occupied, each of the second signals is used to indicate that a subframe that carries the second signal is occupied, r, t and s are positive integers, and t is less than or equal to n; the sending module is specifically configured to send the first signal on each data frame of t data frames of the n data frames; and the sending module is specifically configured to send the second signal on each subframe of the r subframes in at least the first data frame of data frames that carry the first signal.

With reference to the ninth possible implementation manner of the third aspect, in a tenth possible implementation manner of the third aspect, the sending module is specifically configured to send the first signal on each data frame of the t data frames of the n data frames, where t is equal to n.

With reference to the ninth possible implementation manner of the third aspect, in an eleventh possible implementation manner of the third aspect, when the m data frames in which the n data frames determined by the determining module are located are divided into f periods according to a same data frame occupation pattern, t is a quantity of data frames occupied in each period of the f periods, f is a positive integer, and a product of t and f is equal to n;

the sending module is specifically configured to send the first signal on each data frame of the t data frames of the n data frames separately, where the t data frames are t data frames occupied in the first period of the f periods.

With reference to the eleventh possible implementation manner of the third aspect, in a twelfth possible implementation manner of the third aspect, the first signal sent by the sending module is further used to indicate a quantity of data frames included in each period of the f periods.

With reference to the third aspect, in a thirteenth possible implementation manner of the third aspect, the first resource determined by the determining module includes g time-frequency resources that are respectively located in g consecutive data frames, subframe occupation patterns, of the g time-frequency resources, in a data frame corresponding to each of the g time-frequency resources are the same, the subframe occupation pattern corresponds to the $j^{th}$ subframe to the $(j+g-1)^{th}$ subframe in one data frame, and j and g are positive integers; and the sending module is specifically configured to send the occupation signal on the $(j+k-1)^{th}$ subframe in the $k^{th}$ data frame in the g data frames, where k is any one of 1, . . . , g, and the occupation signal is used to indicate that a subframe that carries the occupation signal is occupied.

According to a fourth aspect, user equipment is provided, where the user equipment includes:

a detection module, configured to detect at least one occupation signal, where the at least one occupation signal is used to indicate occupation of a first resource; and a determining module, configured to determine the occupied first resource according to the at least one occupation signal detected by the detection module.

With reference to the fourth aspect, in a first possible implementation manner of the fourth aspect, the detection module is specifically configured to detect the occupation signal on each data frame of k data frames, where the occupation signal is used to indicate a time-frequency resource occupied in a data frame that carries the occupation signal, and k is a positive integer; and the determining module is specifically configured to determine at least a first time-frequency resource in each data frame of the k data frames that carry the occupation signal as the occupied first resource, where the first time-frequency resource is a time-frequency resource occupied in a data frame and indicated by the occupation signal.

With reference to the first possible implementation manner of the fourth aspect, in a second possible implementation manner of the fourth aspect, the determining module is specifically configured to determine the first time-frequency resource in each data frame of the following data frames as the occupied first resource: the k data frames that carry the occupation signal, and the $(p\times i)^{th}$ data frame after each data frame of the k data frames, where p is a data frame period, p is a positive integer, i is any one of 1, 2, . . . , g, and g is a positive integer.

With reference to the second possible implementation manner of the fourth aspect, in a third possible implementation manner of the fourth aspect, the occupation signal detected by the detection module is further used to indicate the data frame period p.

With reference to the fourth aspect, in a fourth possible implementation manner of the fourth aspect, the at least one occupation signal includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel; the detection module is specifically configured to detect the synchronization signal on each data frame of k data frames, and detect the synchronization channel on at least the first data frame of data frames that carry the synchronization signal, where k is a positive integer; and the determining module is specifically configured to determine at least a first time-frequency resource in each data frame of the k data frames that carry the synchronization signal as the occupied first resource, where the first time-frequency resource is a time-frequency resource occupied in a data frame and indicated by the synchronization channel.

With reference to the fourth possible implementation manner of the fourth aspect, in a fifth possible implementation manner of the fourth aspect, the determining module is specifically configured to determine the first time-frequency resource in each data frame of the following data frames as the occupied first resource: the k data frames that carry the synchronization signal, and the $(p \times i)^{th}$ data frame after each data frame of the k data frames, where p is a data frame period, p is a positive integer, i is any one of 1, 2, ..., g, and g is a positive integer.

With reference to the fifth possible implementation manner of the fourth aspect, in a sixth possible implementation manner of the fourth aspect, the synchronization signal detected by the detection module is further used to indicate the data frame period p.

With reference to the fourth aspect, in a seventh possible implementation manner of the fourth aspect, the at least one occupation signal includes t first signals and s second signals, each of the first signals is used to indicate that a data frame that carries the first signal is occupied, and each of the second signals is used to indicate that a subframe that carries the second signal is occupied, where t and s are positive integers; and the detection module is specifically configured to detect the first signal on each data frame of k data frames, and detect the second signal on each subframe of r subframes in at least the first data frame of the k data frames that carry the first signal, where k and r are positive integers; and the determining module is specifically configured to determine at least a first time-frequency resource in each data frame of the k data frames that carry the first signal as the occupied first resource, where the first time-frequency resource is a time-frequency resource corresponding to the r subframes that carry the second signals in one data frame.

With reference to the seventh possible implementation manner of the fourth aspect, in an eighth possible implementation manner of the fourth aspect, the determining module is specifically configured to determine the first time-frequency resource in each data frame of the following data frames as the occupied first resource: the k data frames that carry the first signal, and the $(p \times i)^{th}$ data frame after each data frame of the k data frames, where p is a data frame period, p is a positive integer, i is any one of 1, 2, ..., g, and g is a positive integer.

With reference to the eighth possible implementation manner of the fourth aspect, in a ninth possible implementation manner of the fourth aspect, the first signal detected by the detection module is further used to indicate the data frame period p.

With reference to the fourth aspect, in a tenth possible implementation manner of the fourth aspect, the detection module is specifically configured to detect the occupation signal on the $(j+k-1)^{th}$ subframe in the $k^{th}$ data frame in g consecutive data frames, where the occupation signal is used to indicate that a subframe that carries the occupation signal is occupied, g and j are positive integers, and k is any one of 1, ..., g; and the determining module is specifically configured to determine at least a first time-frequency resource in each data frame of the g data frames as the occupied first resource, where the first time-frequency resource is a time-frequency resource corresponding to the $j^{th}$ subframe to the $(j+g-1)^{th}$ subframe in one data frame.

Based on the foregoing technical solution, according to the resource allocation method and the user equipment in the embodiments of the present invention, an occupation signal is sent on a selected to-be-occupied resource to indicate occupation of the resource, so as to effectively avoid resource contention between different user equipment or between different user groups and effectively improve user experience.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 6a and FIG. 6b are schematic diagrams of a resource allocation method according to another embodiment of the present invention;

FIG. 7 is a schematic flowchart of a resource allocation method according to another embodiment of the present invention;

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that in the embodiments of the present invention, user equipment (English: User Equipment, UE for short) may be referred to as a terminal (Terminal), a mobile station (English: Mobile Station, MS for short), a mobile terminal (Mobile Terminal), or the like. The user equipment may be a mobile phone (or referred to as a "cellular" phone), a computer with a mobile terminal, or the like. For example, the user equipment may also be a portable, pocket-sized, handheld, computer built-in, or in-vehicle mobile apparatus.

It should further be understood that in the embodiments of the present invention, first user equipment and second user equipment are termed merely for ease of description, and are not intended to constitute any limitation.

Figure 1:
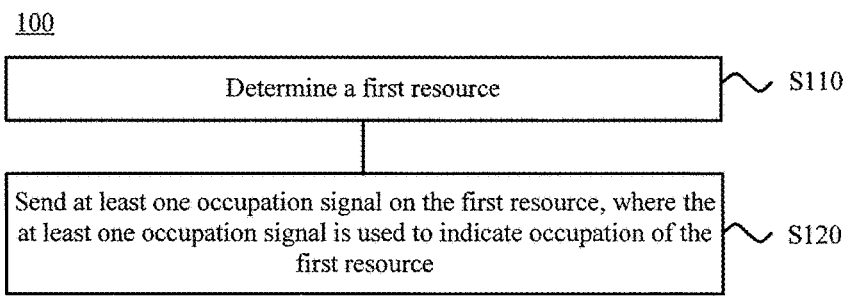
FIG. 1 is a schematic flowchart of a resource allocation method according to an embodiment of the present invention.

FIG. 1 is a schematic flowchart of a resource allocation method according to an embodiment of the present invention. A method 100 is executed, for example, by first user equipment. Referring to FIG. 1, the method 100 includes:

S110. The first user equipment determines a first resource.

S120. The first user equipment sends at least one occupation signal on the first resource, where the at least one occupation signal is used to indicate occupation of the first resource.

The first user equipment determines to occupy the first resource. For example, the first resource may be a time-frequency resource that occupies a specific time resource in a time domain and occupies a specific frequency resource in a frequency domain. Specifically, the first resource may be, for example, a time-frequency resource in one or more data frames. At least one occupation signal is sent on the first resource, and the at least one occupation signal is used to indicate occupation of the first resource, and specifically, may be used to indicate occupation of the first resource by the first user equipment, or may be used to indicate occupation of the first resource by a user group to which the first user equipment belongs.

Therefore, according to the resource allocation method in this embodiment of the present invention, an occupation signal is sent on a selected to-be-occupied resource to indicate occupation of the resource, so as to effectively avoid resource contention between different user equipment or between different user groups and effectively improve user experience.

Figure 2:
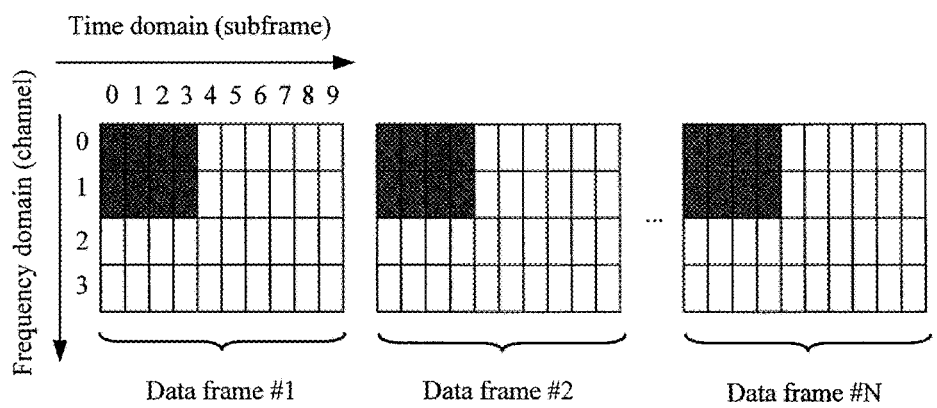
FIG. 2 is a schematic diagram of a time-frequency resource according to an embodiment of the present invention.

For ease of understanding, FIG. 2 illustrates a schematic diagram of a resource in the communications field. A resource may have two dimensions: a time domain and a frequency domain. For example, a resource may be divided into data frames in the time domain (FIG. 2 illustrates N data frames schematically). For example, 1 s is used as a data frame, and each data frame is further divided into subframes. In 10 subframes shown in FIG. 2, 0.1 s is used as a subframe. In the frequency domain, a resource is divided into channels, for example, 4 channels shown in FIG. 2. The user equipment may select a specific time-frequency resource for data transmission. For example, if a resource that occupies subframe 0 to subframe 3 in the time domain and occupies channel 0 and channel 1 in the frequency domain, and that is located in each data frame shown in FIG. 2 (a resource corresponding to a shadow area in each data frame in FIG. 2) is selected, it indicates that data is transmitted on channel 0 and channel 1 by occupying a time period of 0.4 s every 1 s.

In S110, the first user equipment determines the first resource. Specifically, as shown in FIG. 2, a time-frequency resource corresponding to the shadow area in FIG. 2 may be determined as the first resource, that is, data is transmitted on channel 0 and channel 1 by occupying the time period of 0.4 s every 1 s.

It should be understood that the data frame, the subframe, and the channel are intended for ease of describing time and frequency information of the resource, and the time information and the frequency information of the resource may also be defined by using other methods. The time information and the frequency information of the resource may also be described by using other names, which is not limited by this embodiment of the present invention.

In S120, the first user equipment sends at least one occupation signal on the first resource. Specifically, using the first resource shown in FIG. 2 as an example, the occupation signal may be sent on each data frame corresponding to the first resource shown in FIG. 2, where the occupation signal is used to indicate occupation of the first resource; or, the occupation signal may also be sent on some data frames of all data frames corresponding to the first resource shown in FIG. 2, so as to indicate occupation of the first resource, which is not limited by this embodiment of the present invention. The following gives detailed description with reference to FIG. 3 to FIG. 6.

It should be understood that in S120, the first user equipment sends at least one occupation signal on the first resource, where the at least one occupation signal may be one occupation signal or may be multiple occupation signals. Specifically, when the at least one occupation signal is one occupation signal, the one occupation signal may indicate occupation of the first resource; or when the at least one occupation signal is multiple occupation signals, a combination of the multiple occupation signals is used to indicate occupation of the first resource. In addition, when the at least one occupation signal is multiple occupation signals, the multiple occupation signals may be occupation signals of a same type or may be occupation signals of different types, such as a synchronization signal and a synchronization channel, which is not limited by this embodiment of the present invention. The following gives detailed description with reference to FIG. 3 to FIG. 6.

It should further be understood that in D2D direct-connection communication, multiple user equipment may form a user group (Group) or a user cluster (Cluster). The first user equipment in this embodiment of the present invention may be, for example, any user equipment having a resource allocation function in a user group or a user cluster. For example, the first user equipment may also be referred to as a cluster head.

It should further be understood that the at least one occupation signal sent by the first user equipment on the first resource may be used to indicate occupation of the first resource by the first user equipment, and may also be used to indicate occupation of the first resource by all user equipment included in the user group or user cluster to which the first user equipment belongs, which is not limited by this embodiment of the present invention. Specifically, for example, the at least one occupation signal may carry identification information of the user group to which the first user equipment belongs. After detecting the at least one occupation signal, another user equipment determines, by recognizing or matching the identification information carried in the occupation signal, whether the other user equipment and the first user equipment belong to a same user group or a same user cluster. When determining that the other user equipment and the first user equipment belong to the same user group or the same user cluster, the other user equipment may directly occupy the first resource. When determining that the other user equipment and the first user equipment do not belong to the same user group or the same user cluster, the another user equipment avoids occupying the first resource during communication.

Therefore, according to the resource allocation method in this embodiment of the present invention, an occupation signal is sent on a selected to-be-occupied resource to indicate occupation of the resource, so as to effectively avoid resource contention between different user equipment or between different user groups and effectively improve user experience.

The following elaborates, with reference to FIG. 3 to FIG. 6, on sending of the at least one occupation signal on the first resource, so as to indicate occupation of the first resource.

Optionally, in this embodiment of the present invention, the first resource includes n time-frequency resources, the n time-frequency resources are respectively located in n data frames of m data frames, n and m are positive integers, and n is not greater than m.

The sending, by the first user equipment, at least one occupation signal on the first resource includes:

sending, by the first user equipment, the occupation signal on each data frame of k data frames of the n data frames, where the occupation signal is used to indicate a time-frequency resource occupied in a data frame that carries the occupation signal, k is a positive integer, and k is not greater than n.

It should be understood that the m data frames may be data frames predefined by a system, the to-be-occupied first resource selected by the first user equipment includes the n time-frequency resources, and the n time-frequency resources are respectively located in the n data frames of the m data frames. It should further be understood that the sending, by the first user equipment, the occupation signal on each data frame of k data frames of the n data frames specifically refers to: The first user equipment may send the occupation signal on each data frame of the n data frames to indicate occupation of the first resource; the first user equipment may also send the occupation signal on some data frames of the n data frames to indicate occupation of the first resource.

Optionally, in this embodiment of the present invention, the first user equipment sends the occupation signal on each data frame of the k data frames of the n data frames, where k is equal to n.

Figure 3:
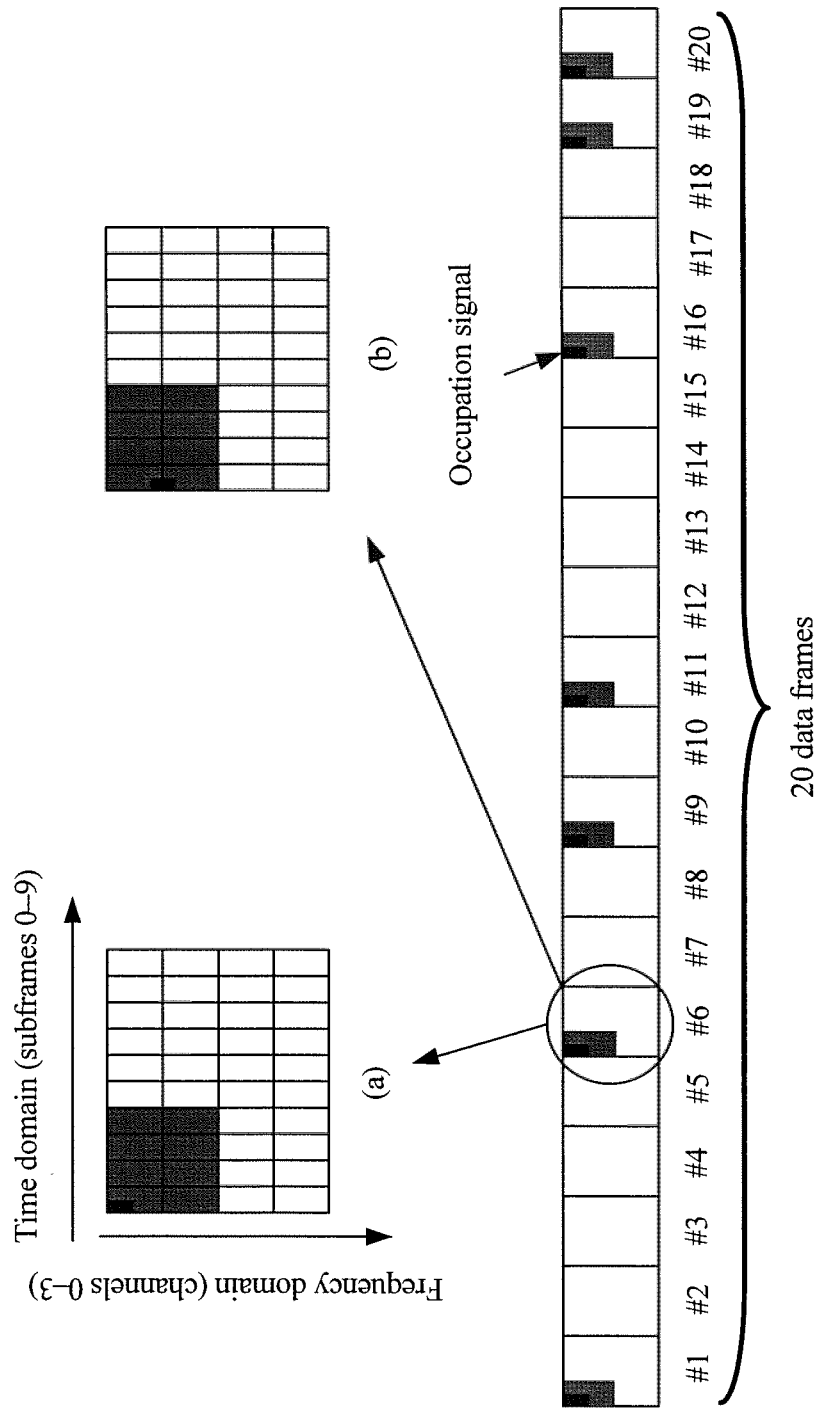
FIG. 3 is a schematic diagram of a resource allocation method according to an embodiment of the present invention.

The first user equipment sends the occupation signal on each data frame corresponding to the first resource to indicate occupation of the first resource. Specifically, as shown in FIG. 3, m is equal to 20, and n is equal to 7. That is, the first resource includes 7 time-frequency resources (time-frequency resources corresponding to 7 shadow areas shown in FIG. 3). The 7 time-frequency resources are respectively located in the $1^{st}$, $6^{th}$, $9^{th}$, $11^{th}$, $16^{th}$, $19^{th}$, and $20^{th}$ data frames of the 20 system-predefined data frames shown in FIG. 3. Specifically, each of the 7 time-frequency resources occupies subframe 0 to subframe 3 in the time domain and occupies channel 0 and channel 1 in the frequency domain in a data frame corresponding to each of the time-frequency resources, as shown in an enlarged view of data frame #6. To indicate occupation of the first resource, the first user equipment sends the occupation signal on each data frame of the 7 data frames corresponding to the first resource, where the occupation signal is used to indicate the time-frequency resource occupied in the data frame that carries the occupation signal. Specifically, for example, the occupation signal sent on data frame #6 indicates that the time-frequency resource occupied in data frame #6 is: subframe 0 to subframe 3 in the time domain, and channel 0 and channel 1 in the frequency domain. The occupation signal may be sent on the $1^{st}$, $6^{th}$, $9^{th}$, $11^{th}$, $16^{th}$, $19^{th}$, and $20^{th}$ data frames separately to indicate occupation of the first resource.

It should be understood that the occupation signal is used to indicate time information and frequency information of the time-frequency resource occupied in the data frame that carries the occupation signal. Specifically, the occupation signal may indicate a subframe and a channel occupied by the time-frequency resource on one data frame, as shown in Table 1 (using an example in which one data frame includes 4 channels and 10 subframes).

TABLE 1

| Occupation signal | Indicated meaning |
| --- | --- |
| Occupation signal a1 | Channel 0, subframe 0 |
| Occupation signal a2 | Channel 0, subframes (0, 1) |
| . . . | . . . |
| Occupation signal a10 | Channel 0, subframes (0, 1, . . . , 9) |
| Occupation signal b1 | Channels (0, 1), subframe 0 |
| Occupation signal b2 | Channels (0, 1), subframes (0, 1) |
| Occupation signal b3 | Channels (0, 1), subframes (0, 1, 2) |
| Occupation signal b4 | Channels (0, 1), subframes (0, 1, 2, 3) |
| . . . | . . . |
| Occupation signal b10 | Channels (0, 1), subframes (0, 1, . . . , 9) |
| . . . | . . . |
| Occupation signal d1 | Channels (0, 1, 2, 3), subframe 0 |
| Occupation signal d2 | Channels (0, 1, 2, 3), subframes (0, 1) |
| . . . | . . . |
| Occupation signal d10 | Channels (0, 1, 2, 3), subframes (0, 1, . . . , 9) |

For example, occupation signal a1 is used to indicate that a time-frequency resource occupied in a data frame that carries occupation signal a1 is: subframe 0 in the time domain, and channel 0 in the frequency domain. For another example, occupation signal b4 is used to indicate that a time-frequency resource occupied in a data frame that carries occupation signal b4 is: subframe 0 to subframe 3 in the time domain, and channel 0 and channel 1 in the frequency domain. For another example, occupation signal b10 is used to indicate that a time-frequency resource occupied in a data frame that carries occupation signal b10 is: subframe 0 to subframe 9 in the time domain, and channel 0 and channel 1 in the frequency domain.

Specifically, using the first resource shown in FIG. 3 as an example, occupation signal b4 may be sent on the $1^{st}$, $6^{th}$, $9^{th}$, $11^{th}$, $16^{th}$, $19^{th}$, and $20^{th}$ data frames separately to indicate occupation of the first resource, that is, to indicate that the first user equipment or the user equipment in the user group to which the first user equipment belongs occupies the first resource, so that user equipment in another user group avoids using the first resource. In this way, contention for a same resource by different user groups in a D2D direct-connection communication system can be avoided, and user experience can be improved effectively.

It should be understood that the occupation signal shown in Table 1 may be predefined by the system. That is, both a sending party and a detecting party of the occupation signal understand the meaning indicated by the occupation signal. For example, the first user equipment sends occupation signal b3 on a data frame to indicate that the time-frequency resource to be occupied by the first user equipment in this data frame is: channel 0 and channel 1 in the frequency domain, and subframe 0 to subframe 2 in the time domain. When the second user equipment detects occupation signal b3 on this data frame, the second user equipment can also learn that the time-frequency resource occupied by the first user equipment in this data frame is: channel 0 and channel 1 in the frequency domain, and subframe 0 to subframe 2 in the time domain.

It should further be understood that Table 1 enumerates some occupation signals and corresponding indicated meanings by using only an example in which one data frame includes 4 channels and 10 subframes, which is not limited by this embodiment of the present invention. The occupation signal may be used to indicate a time-frequency resource corresponding to any combination of a subframe and a channel in one data frame. For example, occupation signal x may be used to indicate a time-frequency resource on subframes 1, 3, 5, and 7 of channel 1 located in one data frame.

It should further be understood that Table 1 gives merely a specific manner of defining an occupation signal. The occupation signal may also be defined in other manners, which is not limited by this embodiment of the present invention.

It further should be understood that the occupation signal shown in Table 1 may be sent in any time-frequency location in the data frame corresponding to the first resource. Specifically, the first resource shown in FIG. 3 is used as an example. For example, if occupation signal b4 is sent in any location on subframe 0 to subframe 3 in the time domain and on channel 0 and channel 1 in the frequency domain of data frame #6, it indicates that a time-frequency resource occupied in data frame #6 is: subframe 0 to subframe 3 in the time domain, and channel 0 and channel 1 in the frequency domain.

Optionally, in this embodiment of the present invention, the occupation signal may further indicate, by indicating information about a time length and frequency bandwidth, time information and frequency information of the time-frequency resource occupied in the data frame that carries the occupation signal. Specifically, refer to Table 2 (using an example in which one data frame includes 4 channels and 10 subframes).

TABLE 2

| | |
|---|---|
| Occupation signal A1 | Frequency bandwidth 1, time length 1 |
| Occupation signal A2 | Frequency bandwidth 1, time length 2 |
| . . . | . . . |
| Occupation signal A10 | Frequency bandwidth 1, time length 10 |
| Occupation signal B1 | Frequency bandwidth 2, time length 1 |
| Occupation signal B2 | Frequency bandwidth 2, time length 2 |
| Occupation signal B3 | Frequency bandwidth 2, time length 3 |
| Occupation signal B4 | Frequency bandwidth 2, time length 4 |
| . . . | . . . |
| Occupation signal B10 | Frequency bandwidth 2, time length 10 |
| Occupation signal C1 | Frequency bandwidth 3, time length 1 |
| Occupation signal C2 | Frequency bandwidth 3, time length 2 |
| . . . | . . . |
| Occupation signal C10 | Frequency bandwidth 3, time length 10 |

TABLE 2-continued

| | |
|---|---|
| Occupation signal D1 | Frequency bandwidth 4, time length 1 |
| Occupation signal D2 | Frequency bandwidth 4, time length 2 |
| . . . | . . . |
| Occupation signal D10 | Frequency bandwidth 4, time length 10 |

For example, occupation signal A2 is used to indicate that a resource occupied in a data frame that carries occupation signal A2 is: a time-frequency resource of 1 bandwidth occupied in the frequency domain by centering on a frequency domain location of occupation signal A2, and 2 subframes occupied in the time domain starting from a time domain location of occupation signal A2. Specifically, for example, when occupation signal A2 is sent on channel 3 corresponding to subframe 1 in a data frame, the occupation signal is used to indicate that a resource occupied in the data frame that carries occupation signal A2 is: subframe 1 and subframe 2 in the time domain, and channel 3 in the frequency domain. For another example, when occupation signal A2 is sent on channel 1 corresponding to subframe 5 in a data frame, the occupation signal is used to indicate that a resource occupied in the data frame that carries occupation signal A2 is: subframe 5 and subframe 6 in the time domain, and channel 1 in the frequency domain. For another example, when occupation signal B3 is sent in a middle location between channel 2 and channel 3 corresponding to subframe 3 in a data frame, the occupation signal is used to indicate that a resource occupied in the data frame that carries occupation signal B3 is: subframe 3 to subframe 5 in the time domain, and channel 2 and channel 3 in the frequency domain. For another example, when occupation signal B3 is sent in a middle location between channel 1 and channel 2 corresponding to subframe 4 in a data frame, the occupation signal is used to indicate that a resource occupied in the data frame that carries occupation signal B3 is: subframe 4 to subframe 6 in the time domain, and channel 1 and channel 2 in the frequency domain. For another example, when occupation signal C2 is sent on channel 2 corresponding to subframe 3 in a data frame, the occupation signal is used to indicate that a resource occupied in the data frame that carries occupation signal C2 is: subframe 3 and subframe 4 in the time domain, and channel 1 to channel 3 in the frequency domain.

Specifically, still using the first resource shown in FIG. 3 as an example, occupation of the first resource may be indicated by sending occupation signal B4 in a middle location between channel 0 and channel 1 corresponding to subframe 0 in the $1^{st}$, $6^{th}$, $9^{th}$, $11^{th}$, $16^{th}$, $19^{th}$, and $20^{th}$ data frames separately (specifically, as shown in an enlarged view (b) of data frame #6, a black rectangular block indicates occupation signal B4).

It should be understood that the occupation signal shown in Table 2 may also be predefined by the system. That is, both a sending party and a detecting party of the occupation signal understand the meaning indicated by the occupation signal.

It should further be understood that Table 2 enumerates some occupation signals and corresponding indicated meanings by using only an example in which one data frame includes 4 channels and 10 subframes, which is not limited by this embodiment of the present invention. It should further be understood that Table 2 gives merely a specific manner of defining an occupation signal. The occupation signal may also be defined in other manners, which is not limited by this embodiment of the present invention.

Optionally, in this embodiment of the present invention, when the n time-frequency resources included in the first resource occupy all subframes in the time domain in a data frame corresponding to each of the n time-frequency resources, the occupation signal may indicate only frequency information of the n time-frequency resources in the data frame corresponding to each of the n time-frequency resources. Specifically, refer to Table 3 (using an example in which one data frame includes 4 channels and 10 subframes).

TABLE 3

| Occupation signal F1 | Channel 0 |
|---|---|
| Occupation signal F2 | Channel 1 |
| Occupation signal F3 | Channel 2 |
| Occupation signal F4 | Channel 3 |
| Occupation signal F5 | Channels (0, 1) |
| Occupation signal F6 | Channels (0, 2) |
| Occupation signal F7 | Channels (0, 3) |
| Occupation signal F8 | Channels (0, 1, 2) |
| Occupation signal F9 | Channels (0, 1, 3) |
| Occupation signal F10 | Channels (0, 2, 3) |
| Occupation signal F11 | Channels (1, 2, 3) |
| Occupation signal F12 | Channels (0, 1, 2, 3) |

Specifically, for example, occupation signal F5 is used to indicate that a time-frequency resource occupied in a data frame is time-frequency resources in all subframes on channel 0 and channel 1.

It should further be understood that Table 3 gives merely another specific manner of defining an occupation signal. The occupation signal may also be defined in other manners, which is not limited by this embodiment of the present invention.

Therefore, according to the resource allocation method in this embodiment of the present invention, an occupation signal is sent on a selected to-be-occupied first resource to indicate occupation of the first resource, so as to effectively resolve a problem of resource contention between different user equipment or between different user groups and improve user experience.

Optionally, in this embodiment of the present invention, when subframe occupation patterns, of the n time-frequency resources, in a data frame corresponding to each of the n time-frequency resources are the same, and when the m data frames are divided into f periods according to a same data frame occupation pattern, k is a quantity of data frames occupied in each period of the f periods, f is a positive integer, and a product of k and f is equal to n.

The sending, by the first user equipment, the occupation signal on each data frame of k data frames of the n data frames includes:

sending, by the first user equipment, the occupation signal on each data frame of the k data frames occupied in the first period of the f periods.

Figure 4:
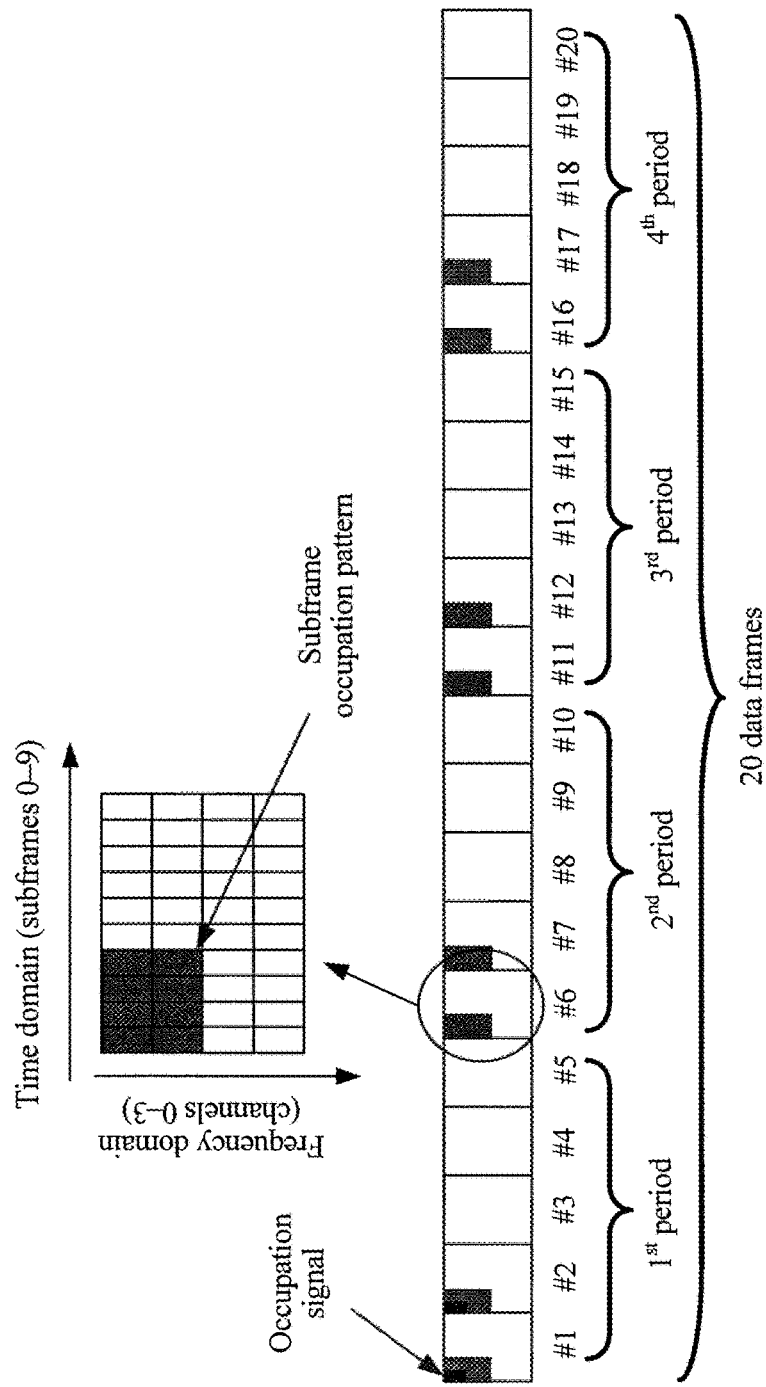
FIG. 4 is a schematic diagram of a resource allocation method according to another embodiment of the present invention.

The first user equipment sends the occupation signal on some data frames of all data frames corresponding to the first resource to indicate occupation of the first resource. Specifically, as shown in FIG. 4, m is equal to 20, and n is equal to 8. That is, the first resource includes 8 time-frequency resources (time-frequency resources corresponding to 8 shadow areas shown in FIG. 4). The 8 time-frequency resources are respectively located in the $1^{st}$, $2^{nd}$, $6^{th}$, $7^{th}$, $11^{th}$, $12^{th}$, $16^{th}$, and $17^{th}$ data frames of the 20 system-predefined data frames shown in FIG. 4, and the 8 time-frequency resources correspond to a same subframe and channel in a data frame corresponding to each of the time-frequency resources, as shown in the enlarged view of data frame #6. That is, the first resource corresponds to a time-frequency resource that occupies subframe 0 to subframe 3 in the time domain and occupies channel 0 and channel 1 in the frequency domain in the $1^{st}$, $2^{nd}$, $6^{th}$, $7^{th}$, $11^{th}$, $12^{th}$, $16^{th}$, and $17^{th}$ data frames separately. The first user equipment may send the occupation signal only on the $1^{st}$ and $2^{nd}$ data frames to indicate occupation of the first resource, where the occupation signal is used to indicate the time-frequency resource occupied in the data frame that carries the occupation signal. Specifically, the occupation signal may be the occupation signal shown in Table 1 or Table 2, and is not limited in this embodiment of the present invention. It should be understood that when the occupation signal is occupation signal B4 shown in Table 2, the first user equipment may send occupation signal B4 in a middle location between channel 0 and channel 1 corresponding to subframe 0 in the $1^{st}$ and $2^{nd}$ data frames separately to indicate occupation of the first resource.

The subframe occupation patterns specifically refer to corresponding subframe and channel situation, corresponding to the n time-frequency resources included in the first resource, in a data frame corresponding to each of the n time-frequency resources. Specifically, for example, in FIG. 4, the subframe occupation pattern of the first resource in data frame #6 is shown in the enlarged view of data frame #6, that is, subframe 0 to subframe 3 in the time domain are occupied, and channel 0 and channel 1 in the frequency domain are occupied. In this embodiment of the present invention, using FIG. 4 as an example, that the subframe occupation patterns, of the n time-frequency resources, in a data frame corresponding to each of the n time-frequency resources are the same specifically refers to: All the 8 time-frequency resources included in the first resource occupy subframe 0 to subframe 3 in the time domain and occupy channel 0 and channel 1 in the frequency domain in the data frame corresponding to each of the time-frequency resources. That is, subframe and channel situations corresponding to the time-frequency resources occupied in all the $1^{st}$, $2^{nd}$, $6^{th}$, $7^{th}$, $11^{th}$, $12^{th}$, $16^{th}$, and $17^{th}$ data frames are the same.

The data frame occupation pattern refers to a data frame occupation status in a data frame period. Specifically, using FIG. 4 as an example, in the 20 data frames predefined by the system, 2 of every 5 data frames are occupied, and the 2 data frames are the $1^{st}$ and $2^{nd}$ data frames of the 5 data frames. The 20 data frames may be divided into 4 periods, and each period includes 5 data frames. Specifically, the data frame occupation pattern in the $1^{st}$ period is to occupy the $1^{st}$ and $2^{nd}$ data frames in the $1^{st}$ period. It should be understood that this data frame occupation pattern may also be figuratively denoted by 11000, in which a quantity of bits represents a quantity of data frames included in a period; and, starting from the left side, the $1^{st}$ bit represents an occupation status of the $1^{st}$ data frame in this period, "1" represents occupied, "0" represents unoccupied, and subsequent bits are interpreted by analogy. Specifically, using the first resource shown in FIG. 4 as an example, the 20 data frames predefined by the system may be divided into 4 periods according to the data frame occupation pattern 11000, each period includes 5 data frames, and 2 data frames thereof are occupied.

For example, as shown in FIG. 4, when the subframe occupation patterns, of the 8 time-frequency resources included in the first resource, in a data frame corresponding to each of the time-frequency resources are the same, and when the 8 data frames are periodically distributed in the 20 data frames and the 20 data frames can be divided into 4 periods according to a same data frame occupation pattern (for example, 11000), k may be the quantity 2 of the data frames occupied in each period of the 4 periods. That is, the occupation signal may be sent only on the $1^{st}$ and $2^{nd}$ data frames of the first period to indicate occupation of the entire first resource.

It should be understood that, it may be agreed, by means of system pre-configurations, to send an occupation signal on the $i^{th}$ data frame, indicating occupation of the $i^{th}$ data frame and the $(i+p\times j)^{th}$ data frame, where p is a predefined data frame period, j is any one of 1, 2, ..., g, and g may be predefined. The data frame period p and g are determined after the first user equipment determines the to-be-occupied first resource. Specifically, using the first resource shown in FIG. 4 as an example, the data frame period p is 5 and g is 3. According to system and configuration information, the first user equipment sends the occupation signal on the $1^{st}$ data frame to indicate occupation of the $1^{st}$ data frame and the $(1+5\times 1)^{th}$, $(1+5\times 2)^{th}$, and $(1+5\times 3)^{th}$ data frames; and sends the occupation signal on the $2^{nd}$ data frame to indicate occupation of the $2^{nd}$ data frame and the $(2+5\times 1)^{th}$, $(2+5\times 2)^{th}$, and $(2+5\times 3)^{th}$ data frames. That is, the first user equipment may send the occupation signal on some data frames of all data frames corresponding to the to-be-occupied first resource, so as to indicate occupation of the entire first resource.

Therefore, according to the resource allocation method in this embodiment of the present invention, an occupation signal is sent on some resources of a selected to-be-occupied first resource to indicate occupation of the first resource, so as to effectively resolve a problem of resource contention between different user equipment or between different user groups, save resources effectively for data transmission, and improve user experience effectively.

It should be understood that in this embodiment of the present invention, occupation of a data frame specifically refers to occupation of a time-frequency resource in this data frame, but not necessarily occupation of all time-frequency resources in this data frame. For brevity of description herein, "occupation of a time-frequency resource in a data frame" is expressed as "occupation of a data frame", and this expression does not constitute any limitation on this embodiment of the present invention.

In the first resource shown in FIG. 4, the occupation signal is sent only on the $1^{st}$ and $2^{nd}$ data frames of the $1^{st}$ period to indicate occupation of the entire first resource, that is, occupation of the following time-frequency resource in the $1^{st}$, $2^{nd}$, $6^{th}$, $7^{th}$, $11^{th}$, $12^{th}$, $16^{th}$, and $17^{th}$ data frames: subframe 0 to subframe 3 in the time domain, and channel 0 and channel 1 in the frequency domain. The occupation signal may also be used to indicate the data frame period p, that is, the quantity of data frames included in each period.

Optionally, in this embodiment of the present invention, the occupation signal may further be used to indicate a quantity of data frames included in each period of the f periods, where f is a positive integer.

Specifically, the quantity of data frames included in each period of the f periods may be referred to as a data frame period. An occupation signal, which may be used to indicate the data frame period, may be shown in Table 4.

TABLE 4

| Occupation signal | Indicated meaning |
| --- | --- |
| Occupation signal E1 | Channel 0, subframe 0, data frame period 1 |

TABLE 4-continued

| Occupation signal | Indicated meaning |
| --- | --- |
| Occupation signal E2 | Channel 0, subframe 1, data frame period 2 |
| ... | ... |
| Occupation signal Es | Channels (0, 1), subframes (0, 1, 2, 3), data frame period 5 |
| ... | ... |
| Occupation signal En | Channel x, subframe y, data frame period p |

Specifically, for example, when occupation signal E2 is sent on the $i^{th}$ data frame, the occupation signal is used to indicate occupation of a time-frequency resource corresponding to channel 0 and subframe 1 in each data frame of the $i^{th}$ data frame and the $(i+1\times j)^{th}$ data frame, where j is any one of 1, 2, ..., g, and g may be predefined by the system.

Specifically, using the first resource shown in FIG. 4 as an example, occupation signal Es may be sent on the $1^{st}$ data frame and the $2^{nd}$ data frame separately to indicate occupation of the first resource, and indicate occupation of the following time-frequency resource in the $1^{st}$, $2^{nd}$, $6^{th}$, $7^{th}$, $11^{th}$, $12^{th}$, $16^{th}$, and $17^{th}$ data frames: subframe 0 to subframe 3 in the time domain, and channel 0 and channel 1 in the frequency domain.

It should be understood that related information of the occupation signal shown in Table 4 may be predefined by the system. That is, for any type of occupation signal, both a sending party and a detecting party of the occupation signal understand the meaning indicated by the occupation signal. For example, the first user equipment sends occupation signal En on the $i^{th}$ data frame to indicate that the user equipment intends to occupy, in this data frame, the time-frequency resources on subframe x and channel y in the $i^{th}$ and $(i+p\times j)^{th}$ data frames. Correspondingly, after the second user equipment detects occupation signal En on the $i^{th}$ data frame, the second user equipment can also learn that the first user equipment intends to occupy the time-frequency resources on subframe x and channel y in the $i^{th}$ and $(i+p\times j)^{th}$ data frames.

It should further be understood that Table 4 gives merely a specific manner of defining an occupation signal. The occupation signal may also be defined in other manners, which is not limited by this embodiment of the present invention.

Therefore, according to the resource allocation method in this embodiment of the present invention, a first user equipment may send an occupation signal on some data frames of to-be-occupied data frames to indicate occupation of all to-be-occupied data frames, so as to save resources for data transmission, effectively avoid resource contention between different user equipment or between different user groups, and effectively improve user experience.

It should be understood that in this embodiment of the present invention, occupation of a data frame specifically refers to occupation of a time-frequency resource in this data frame, but not necessarily occupation of all time-frequency resources in this data frame. For brevity of description herein, "occupation of a time-frequency resource in a data frame" is expressed as "occupation of a data frame", and this expression does not constitute any limitation on this embodiment of the present invention.

Therefore, according to the resource allocation method in this embodiment of the present invention, first user equipment sends an occupation signal on at least one data frame in data frames corresponding to a to-be-occupied first resource, so as to indicate occupation of the first resource. In this way, another user equipment or another user group does not occupy the first resource, and the first user equipment or all user equipment in a user group to which the first user equipment belongs can directly use the first resource, so as to avoid contention for the first resource with user equipment in another user group, improve user experience, and save resources for data transmission.

Optionally, in this embodiment of the present invention, the first resource includes n time-frequency resources, the n time-frequency resources are respectively located in n data frames of m data frames, n and m are positive integers, n is not greater than m, the at least one occupation signal includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel, t and s are positive integers, t is less than or equal to n, and s is less than or equal to t.

The sending, by the first user equipment, at least one occupation signal on the first resource includes:

sending, by the first user equipment, the synchronization signal on each data frame of t data frames of the n data frames; and sending, by the first user equipment, the synchronization channel on at least the first data frame of data frames that carry the synchronization signal.

Specifically, in this embodiment of the present invention, the first user equipment sends two types of signals (that is, a synchronization signal and a synchronization channel) on the first resource to indicate occupation of the first resource. The synchronization signal is used to indicate occupation of a data frame. Specifically, the synchronization signal indicates the to-be-occupied time-frequency resource in this data frame. The occupation channel is used to indicate a time-frequency resource occupied in a data frame. Specifically, the synchronization channel indicates time information and frequency information of the time-frequency resource. By sending the synchronization signal and the synchronization channel, the occupied data frame can be indicated, and a specific time-frequency resource that is occupied in the occupied data frame can also be indicated.

It should be understood that the m data frames may be data frames predefined by a system, the to-be-occupied first resource selected by the first user equipment includes the n time-frequency resources, and the n time-frequency resources are respectively located in the n data frames of the m data frames.

It should further be understood that the sending, by the first user equipment, the synchronization signal on each data frame of t data frames of the n data frames specifically refers to: The first user equipment may send the synchronization signal on each data frame of the n data frames to indicate occupation of the n data frames; the first user equipment may also send the synchronization signal on some data frames of the n data frames to indicate occupation of the n data frames. The sending, by the first user equipment, the synchronization channel on at least the first data frame of data frames that carry the synchronization signal specifically refers to: The first user equipment may send the synchronization channel on each data frame that carries the synchronization signal to indicate a specific occupied time-frequency resource in the occupied data frame, so as to indicate occupation of the entire first resource. The first user equipment may further send the synchronization channel on some data frames (at least the first data frame that carries the synchronization signal) of all data frames that carry the synchronization signal, to indicate the specific occupied time-frequency resources in the occupied data frame, so as to indicate occupation of the entire first resource.

Optionally, in this embodiment of the present invention, the first user equipment sends the synchronization signal on each data frame of the t data frames of the n data frames, where t is equal to n.

The first user equipment sends the synchronization signal on each data frame corresponding to the first resource, and sends the synchronization channel on at least the first data frame in the data frames that carry the synchronization signal, so as to indicate occupation of the first resource. Specifically, still using the first resource shown in FIG. 3 as an example, m is equal to 20, and n is equal to 7. That is, the first resource includes 7 time-frequency resources (time-frequency resources corresponding to 7 shadow areas shown in FIG. 3). The 7 time-frequency resources are respectively located in the $1^{st}$, $6^{th}$, $9^{th}$, $11^{th}$, $16^{th}$, $19^{th}$, and $20^{th}$ data frames of the 20 system-predefined data frames shown in FIG. 3. Specifically, each of the 7 time-frequency resources occupies subframe 0 to subframe 3 in the time domain and occupies channel 0 and channel 1 in the frequency domain in a data frame corresponding to each of the time-frequency resources, as shown in an enlarged view of data frame #6. For the first resource shown in FIG. 3, the synchronization channel indicates that the time-frequency resource occupied in the data frame that carries the synchronization channel is: subframe 0 to subframe 3 in the time domain, and channel 0 and channel 1 in the frequency domain. The first user equipment sends the synchronization signal and the synchronization channel on each data frame of the 7 data frames corresponding to the first resource, so as to indicate occupation of the following time-frequency resource in the $1^{st}$, $6^{th}$, $9^{th}$, $11^{th}$, $16^{th}$, $19^{th}$ and $20^{th}$ data frames: subframe 0 to subframe 3 in the time domain, and channel 0 and channel 1 in the frequency domain, that is, claim occupation of the first resource.

Optionally, in this embodiment of the present invention, the sending, by the first user equipment, the synchronization channel on at least the first data frame of the t data frames includes:

sending, by the first user equipment, the synchronization channel on each data frame in the data frames that carry the synchronization signal.

It should be understood that the first user equipment may also send the synchronization channel on some data frames of all data frames corresponding to the first resource to indicate occupation of the first resource. Specifically, using the first resource shown in FIG. 3 as an example, the first user equipment sends the synchronization signal on the $1^{st}$, $6^{th}$, $9^{th}$, $11^{th}$, $16^{th}$, $19^{th}$, and $20^{th}$ data frames separately, and sends the synchronization channel on the $1^{st}$, $11^{th}$, and 20 data frames separately, so as to indicate occupation of the first resource. It should be understood that the system may predefine that subframe information and channel information of the time-frequency resources occupied in the data frames that carry the synchronization signal are the same. For example, by sending the synchronization signal but sending no synchronization channel on the $6^{th}$ data frame, it can also be indicated that the time-frequency resource occupied in the $6^{th}$ data frame is the same as the time-frequency resource occupied in the $1^{st}$ data frame. That is, the following time-frequency resource is occupied: subframe 0 to subframe 3 in the time domain, and channel 0 and channel 1 in the frequency domain.

It should be understood that the synchronization channel may be periodically sent on the data frame that carries the synchronization signal, which is not limited by this embodiment of the present invention. A sending period depends on a specific communication status, and is not limited by this embodiment of the present invention.

Therefore, according to the resource allocation method in this embodiment of the present invention, a synchronization signal and a synchronization channel are sent on a selected to-be-occupied resource to indicate occupation of the resource, so as to effectively avoid resource contention between different user equipment or between different user groups and effectively improve user experience.

Optionally, the synchronization channel in this embodiment of the present invention may also be the occupation signal shown in Table 1 or Table 2. That is, the synchronization channel may indicate a subframe and a channel of a to-be-occupied time-frequency resource in a data frame, or indicate a time length and a frequency bandwidth of a to-be-occupied time-frequency resource in a data frame. Specifically, when the synchronization channel is occupation signal B4 in Table 2, using the first resource shown in FIG. 3 as an example, the synchronization channel is sent in a middle location between channel 0 and channel 1 corresponding to subframe 0 of the $1^{st}$ data frame, so as to indicate that a time-frequency resource occupied in the $1^{st}$ data frame is: subframe 0 to subframe 3 in the time domain, and channel 0 and channel 1 in the frequency domain.

Therefore, according to the resource allocation method in this embodiment of the present invention, an occupation signal is sent on a selected to-be-occupied first resource to indicate occupation of the first resource, so as to effectively resolve a problem of resource contention between different user equipment or between different user groups and improve user experience.

Optionally, in this embodiment of the present invention, when subframe occupation patterns, of the n time-frequency resources, in a data frame corresponding to each of the n time-frequency resources are the same, and when the m data frames are divided into f periods according to a same data frame occupation pattern, t is a quantity of data frames occupied in each period of the f periods, f is a positive integer, and a product of t and f is equal to n.

The sending, by the first user equipment, the synchronization signal on each data frame of t data frames of the n data frames includes:

sending, by the first user equipment, the synchronization signal on each data frame of the t data frames occupied in the first period of the f periods.

The first user equipment sends the synchronization signal and the synchronization channel on some data frames of all data frames corresponding to the first resource to indicate occupation of the first resource. Specifically, still using the first resource shown in FIG. 4 as an example, m is equal to 20, and n is equal to 8. That is, the first resource includes 8 time-frequency resources (time-frequency resources corresponding to 8 shadow areas shown in FIG. 4). The 8 time-frequency resources are respectively located in the $1^{st}$, $2^{nd}$, $6^{th}$, $7^{th}$, $11^{th}$, $12^{th}$, $16^{th}$, and $17^{th}$ data frames of the 20 system-predefined data frames shown in FIG. 4, and the 8 time-frequency resources correspond to a same subframe and channel in a data frame corresponding to each of the time-frequency resources, as shown in the enlarged view of data frame #6. That is, the first resource corresponds to a time-frequency resource that occupies subframe 0 to subframe 3 in the time domain and occupies channel 0 and channel 1 in the frequency domain in the $1^{st}$, $2^{nd}$, $6^{th}$, $7^{th}$, $11^{th}$, $12^{th}$, $16^{th}$, and $17^{th}$ data frames separately. The first user equipment may send the synchronization signal only on the $1^{st}$ and $2^{nd}$ data frames, and send the synchronization channel on either the $1^{st}$ data frame or the $2^{nd}$ data frame or send the synchronization channel on the $1^{st}$ and $2^{nd}$ data frames separately, so as to indicate that the time-frequency resource occupied in the $1^{st}$, $2^{nd}$, $6^{th}$, $7^{th}$, $11^{th}$, $12^{th}$, $16^{th}$, and $17^{th}$ data frames is: subframe 0 to subframe 3 in the time domain, and channel 0 and channel 1 in the frequency domain.

The subframe occupation patterns specifically refer to corresponding subframe and channel situation, corresponding to the n time-frequency resources included in the first resource, in a data frame corresponding to each of the n time-frequency resources. Specifically, for example, in FIG. 4, the subframe occupation pattern of the first resource in data frame #6 is shown in the enlarged view of data frame #6, that is, subframe 0 to subframe 3 in the time domain are occupied, and channel 0 and channel 1 in the frequency domain are occupied. In this embodiment of the present invention, using FIG. 4 as an example, that the subframe occupation patterns, of the n time-frequency resources, in a data frame corresponding to each of the n time-frequency resources are the same specifically refers to: All the 8 time-frequency resources included in the first resource occupy subframe 0 to subframe 3 in the time domain and occupy channel 0 and channel 1 in the frequency domain in the data frame corresponding to each of the time-frequency resources. That is, subframe and channel situations corresponding to the time-frequency resources occupied in all the $1^{st}$, $2^{nd}$, $6^{th}$, $7^{th}$, $11^{th}$, $12^{th}$, $16^{th}$, and $17^{th}$ data frames are the same.

The data frame occupation pattern refers to a data frame occupation status in a data frame period. Specifically, using FIG. 4 as an example, in the 20 data frames predefined by the system, 2 of every 5 data frames are occupied, and the 2 data frames are the and $2^{nd}$ data frames of the 5 data frames. The 20 data frames may be divided into 4 periods, and each period includes 5 data frames. Specifically, the data frame occupation pattern in the $1^{st}$ period is to occupy the $1^{st}$ and $2^{nd}$ data frames in the $1^{st}$ period. It should be understood that this data frame occupation pattern may also be figuratively denoted by 11000, in which a quantity of bits represents a quantity of data frames included in a period; and, starting from the left side, the $1^{st}$ bit represents an occupation status of the $1^{st}$ data frame in this period, "1" represents occupied, "0" represents unoccupied, and subsequent bits are interpreted by analogy. Specifically, using the first resource shown in FIG. 4 as an example, the 20 data frames predefined by the system may be divided into 4 periods according to the data frame occupation pattern 11000, each period includes 5 data frames, and 2 data frames thereof are occupied.

For example, as shown in FIG. 4, when the subframe occupation patterns, of the 8 time-frequency resources included in the first resource, in a data frame corresponding to each of the time-frequency resources are the same, and when the 8 data frames are periodically distributed in the 20 data frames and the 20 data frames can be divided into 4 periods according to a same data frame occupation pattern (for example, 11000), k may be the quantity 2 of the data frames occupied in each period of the 4 periods. That is, the synchronization signal and the synchronization channel may be sent only on the $1^{st}$ and $2^{nd}$ data frames of the first period to indicate occupation of the entire first resource.

It should be understood that, it may be agreed, by means of system pre-configurations, to send the synchronization signal on the $i^{th}$ data frame, indicating occupation of the $i^{th}$ data frame and the $(i+p\times j)^{th}$ data frame, where p is a predefined data frame period, j is any one of 1, 2, ..., g, and g may be predefined. The data frame period p and g are determined after the first user equipment determines the to-be-occupied first resource. Specifically, using the first resource shown in FIG. 4 as an example, the data frame period p is 5 and g is 3. According to system and configuration information, the first user equipment sends the synchronization signal on the $1^{st}$ data frame to indicate occupation of the $1^{st}$ data frame and the $(1+5\times 1)^{th}$, $(1+5\times 2)^{th}$, and $(1+5\times 3)^{th}$ data frames; and sends the synchronization signal on the $2^{nd}$ data frame to indicate occupation of the $2^{nd}$ data frame and the $(2+5\times 1)^{th}$, $(2+5\times 2)^{th}$, and $(2+5\times 3)^{th}$ data frames. That is, the first user equipment may send the synchronization signal and the synchronization channel on some data frames of all data frames corresponding to the to-be-occupied first resource, so as to indicate occupation of the entire first resource.

Therefore, according to the resource allocation method in this embodiment of the present invention, an occupation signal is sent on some resources of a selected to-be-occupied first resource to indicate occupation of the first resource, so as to effectively resolve a problem of resource contention between different user equipment or between different user groups, save resources effectively for data transmission, and improve user experience effectively.

Optionally, in this embodiment of the present invention, the synchronization signal is further used to indicate a quantity of data frames included in each period of the f periods.

Therefore, according to the resource allocation method in this embodiment of the present invention, first user equipment sends a synchronization signal and a synchronization channel on at least one data frame in data frames corresponding to a to-be-occupied first resource, so as to indicate occupation of the first resource. In this way, another user equipment or another user group does not occupy the first resource, and the first user equipment or all user equipment in a user group to which the first user equipment belongs can directly use the first resource, so as to avoid contention for the first resource with user equipment in another user group, improve user experience, and save resources for data transmission.

Optionally, in this embodiment of the present invention, the first resource includes n time-frequency resources, the n time-frequency resources are respectively located in n data frames of m data frames, n and m are positive integers, n is not greater than m, subframe occupation patterns, of the n time-frequency resources, in a data frame corresponding to each of the n time-frequency resources are the same, the subframe occupation pattern corresponds to r subframes in one data frame, the at least one occupation signal includes t first signals and s second signals, each of the first signals is used to indicate that a data frame that carries the first signal is occupied, each of the second signals is used to indicate that a subframe that carries the second signal is occupied, r, t and s are positive integers, and t is less than or equal to n.

The sending, by the first user equipment, at least one occupation signal on the first resource includes:

sending, by the first user equipment, the first signal on each data frame of t data frames of the n data frames; and sending, by the first user equipment, the second signal on each subframe of the r subframes in at least the first data frame of data frames that carry the first signal.

Specifically, in this embodiment of the present invention, the first user equipment sends two types of signals (that is, the first signal and the second signal) on the first resource to indicate occupation of the first resource. The first signal is used to indicate occupation of a data frame. Specifically, the first signal is used to indicate a to-be-occupied time-frequency resource in this data frame. The second signal is used to indicate occupation of a subframe that carries the second signal.

Optionally, in this embodiment of the present invention, the first user equipment sends the first signal on each data frame of the t data frames of the n data frames, where t is equal to n.

It should be understood that the m data frames may be data frames predefined by a system, the to-be-occupied first resource selected by the first user equipment includes the n time-frequency resources, and the n time-frequency resources are respectively located in the n data frames of the m data frames.

Figure 5A:
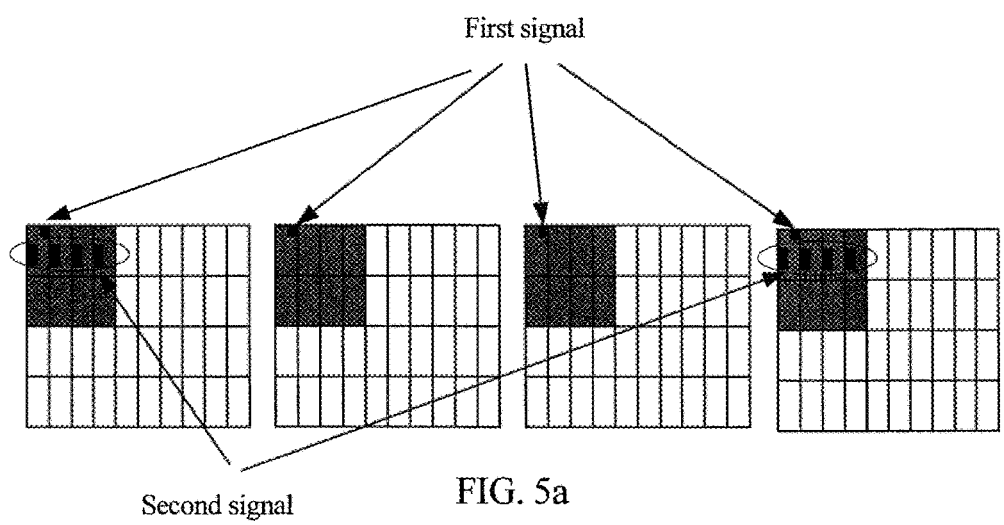
FIG. 5a and FIG. 5b are schematic diagrams of a resource allocation method according to another embodiment of the present invention.

Specifically, as shown in FIG. 5(a), for example, m is 4, and n is 4. That is, the first resource includes 4 time-frequency resources (time-frequency resources corresponding to 4 shadow areas shown in FIG. 5(a)). The 4 time-frequency resources are located in 4 predefined data frames. Each of the 4 time-frequency resources occupies subframe 0 to subframe 3 in the time domain and occupies channel 0 and channel 1 in the frequency domain in a data frame corresponding to each of the time-frequency resources. That is, the subframe occupation pattern is: Subframe 0 to subframe 3 in the time domain are occupied, and channel 0 and channel 1 in the frequency domain are occupied. Correspondingly, r subframes are subframe 0 to subframe 3.

The first user equipment sends the first signal on the 4 data frames separately, so as to indicate that the 4 data frames are occupied; and sends the second signal on subframe 0 to subframe 3 in the $1^{st}$ data frame and the $4^{th}$ data frame, so as to indicate that a time-frequency resource occupied in the $1^{st}$ data frame is: subframe 0 to subframe 3 in the time domain, and channel 0 and channel 1 in the frequency domain. Although the second signal is not sent on the $2^{nd}$ and $3^{rd}$ data frames, the system may predefine that subframe information and channel information of time-frequency resources occupied in the data frames that carry the first signal are the same, so as to indicate that time-frequency resources occupied in the $2^{nd}$ and $3^{rd}$ data frames are: subframe 0 to subframe 3 in the time domain, and channel 0 and channel 1 in the frequency domain.

It should be understood that FIG. 5(a) gives only a specific example, and the method shown in FIG. 5 does not constitute any limitation on this embodiment of the present invention. By sending the first signal on at least one data frame of all data frames corresponding to the first resource and sending the second signal on at least one data frame of the data frames for sending the first signal, occupation of the entire first resource can be indicated.

Therefore, according to the resource allocation method in this embodiment of the present invention, first user equipment sends an occupation signal on at least one data frame in data frames corresponding to a to-be-occupied first resource, so as to indicate occupation of the first resource. In this way, another user equipment or another user group does not occupy the first resource, and the first user equipment or all user equipment in a user group to which the first user equipment belongs can directly use the first resource, so as to avoid contention for the first resource with user equipment in another user group, improve user experience, and save resources for data transmission.

Optionally, in this embodiment of the present invention, the second signal is further used to indicate frequency information of the time-frequency resource.

Figure 5B:
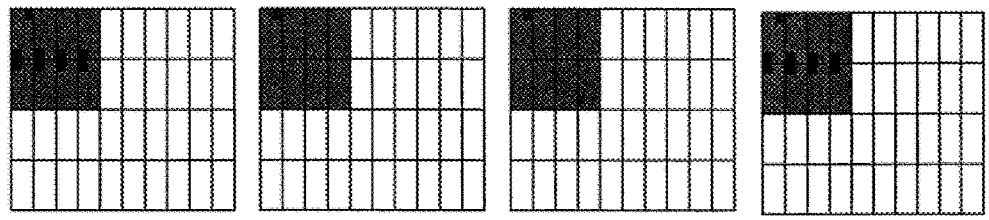

In this embodiment of the present invention, in addition to indicating occupation of a subframe in which the second signal is located, the second signal is further used to indicate frequency information of the first resource, and specifically, may directly indicate a channel occupied by the first resource and may also indicate a frequency bandwidth occupied by the first resource. Specifically, as shown in FIG. 5(a), when the second signal is used to indicate the channel occupied by the first resource, that is, directly indicate channel 0 and channel 1, the second signal may be sent in any frequency domain location of subframe 0 to subframe 3, so as to indicate that a time-frequency resource occupied in a data frame is: subframe 0 to subframe 3 in the time domain, and channel 0 and channel 1 in the frequency domain. The second signal may also indicate the frequency bandwidth occupied by the first resource. Specifically, using the first resource shown in FIG. 5(b) as an example, the second signal is used to indicate occupation of the subframe in which the second signal is located, and indicate that 2 frequency bandwidths are occupied in the frequency domain. As shown in FIG. 5(b), the second signal may be sent in a middle location between channel 0 and channel 1 of frequency domain locations of subframe 0 to subframe 3 separately, so as to indicate that the time-frequency resource occupied in the data frame is: subframe 0 to subframe 3 in the time domain, and channel 0 and channel 1 in the frequency domain.

Optionally, in this embodiment of the present invention, when the m data frames are divided into f periods according to a same data frame occupation pattern, t is a quantity of data frames occupied in each period of the f periods, where f is a positive integer and a product of t and f is equal to n.

The sending, by the first user equipment, the first signal on each data frame of t data frames of the n data frames includes:

sending, by the first user equipment, the first signal on each data frame of the t data frames occupied in the first period of the f periods.

Specifically, still using the first resource shown in FIG. 4 as an example, m is equal to 20, and n is equal to 8. That is, the first resource includes 8 time-frequency resources (time-frequency resources corresponding to 8 shadow areas shown in FIG. 4). The 8 time-frequency resources are respectively located in the $1^{st}$, $2^{nd}$, $6^{th}$, $7^{th}$, $11^{th}$, $12^{th}$, $16^{th}$, and $17^{th}$ data frames of the 20 system-predefined data frames shown in FIG. 4, and the 8 time-frequency resources correspond to a same subframe and channel in a data frame corresponding to each of the time-frequency resources, as shown in the enlarged view of data frame #6. That is, the first resource corresponds to a time-frequency resource that occupies subframe 0 to subframe 3 in the time domain and occupies channel 0 and channel 1 in the frequency domain in the $1^{st}$, $2^{nd}$, $6^{th}$, $7^{th}$, $11^{th}$, $12^{th}$, $16^{th}$, and $17^{th}$ data frames separately. The subframe occupation pattern is: Subframe 0 to subframe 3 in the time domain are occupied, and channel 0 and channel 1 in the frequency domain are occupied. Correspondingly, r subframes are subframe 0 to subframe 3.

The first user equipment may send the first signal only on the $1^{st}$ and $2^{nd}$ data frames, and send the second signal on either the $1^{st}$ data frame or the $2^{nd}$ data frame or send the second signal on each subframe of the r subframes in the $1^{st}$ and $2^{nd}$ data frames, so as to indicate that the time-frequency resource occupied in the $1^{st}$, $6^{th}$, $7^{th}$, $11^{th}$, $12^{th}$, $16^{th}$, and $17^{th}$ data frames is: subframe 0 to subframe 3 in the time domain, and channel 0 and channel 1 in the frequency domain.

The data frame occupation pattern refers to a data frame occupation status in a data frame period. Specifically, using FIG. 4 as an example, in the 20 data frames predefined by the system, 2 of every 5 data frames are occupied, and the 2 data frames are the $1^{st}$ and $2^{nd}$ data frames of the 5 data frames. The 20 data frames may be divided into 4 periods, and each period includes 5 data frames. Specifically, the data frame occupation pattern in the $1^{st}$ period is to occupy the $1^{st}$ and $2^{nd}$ data frames in the $1^{st}$ period. It should be understood that this data frame occupation pattern may also be figuratively denoted by 11000, in which a quantity of bits represents a quantity of data frames included in a period; and, starting from the left side, the $1^{st}$ bit represents an occupation status of the $1^{st}$ data frame in this period, "1" represents occupied, "0" represents unoccupied, and subsequent bits are interpreted by analogy. Specifically, using the first resource shown in FIG. 4 as an example, the 20 data frames predefined by the system may be divided into 4 periods according to the data frame occupation pattern 11000, each period includes 5 data frames, and 2 data frames thereof are occupied.

For example, as shown in FIG. 4, when the subframe occupation patterns, of the 8 time-frequency resources included in the first resource, in a data frame corresponding to each of the time-frequency resources are the same, and when the 8 data frames are periodically distributed in the 20 data frames and the 20 data frames can be divided into 4 periods according to a same data frame occupation pattern (for example, 11000), k may be the quantity 2 of the data frames occupied in each period of the 4 periods. That is, the first signal and the second signal may be sent only on the $1^{st}$ and $2^{nd}$ data frames of the first period to indicate occupation of the entire first resource.

It should be understood that, it may be agreed, by means of system pre-configurations, to send the first signal on the $i^{th}$ data frame, indicating occupation of the $i^{th}$ data frame and the $(i+p \times j)^{th}$ data frame, where p is a predefined data frame period, j is any one of 1, 2, . . . , g, and g may be predefined. The data frame period p and g are determined after the first user equipment determines the to-be-occupied first resource. Specifically, using the first resource shown in FIG. 4 as an example, the data frame period p is 5 and g is 3. According to system and configuration information, the first user equipment sends the first signal on the $1^{st}$ data frame to indicate occupation of the $1^{st}$ data frame and the $(1+5 \times 1)^{th}$, $(1+5 \times 2)^{th}$, and $(1+5 \times 3)^{th}$ data frames; and sends the first signal on the $2^{nd}$ data frame to indicate occupation of the $2^{nd}$ data frame and the $(2+5 \times 1)^{th}$, $(2+5 \times 2)^{th}$, and $(2+5 \times 3)^{th}$ data frames. That is, the first user equipment may send the first signal and the second signal on some data frames of all data frames corresponding to the to-be-occupied first resource, so as to indicate occupation of the entire first resource.

Optionally, in this embodiment of the present invention, the first signal is further used to indicate a quantity of data frames included in each period of the f periods.

Therefore, according to the resource allocation method in this embodiment of the present invention, an occupation signal is sent on some resources of a selected to-be-occupied first resource to indicate occupation of the first resource, so as to effectively resolve a problem of resource contention between different user equipment or between different user groups, save resources effectively for data transmission, and improve user experience effectively.

It should be understood that in this embodiment of the present invention, the first signal may be a signal that is the same as the second signal.

Therefore, according to the resource allocation method in this embodiment of the present invention, an occupation signal is sent on a selected to-be-occupied resource to indicate occupation of the resource, so as to effectively avoid resource contention between different user equipment or between different user groups and effectively improve user experience.

Optionally, in this embodiment of the present invention, the first resource includes g time-frequency resources that are respectively located in g consecutive data frames, subframe occupation patterns, of the g time-frequency resources, in a data frame corresponding to each of the g time-frequency resources are the same, the subframe occupation pattern corresponds to the $j^{th}$ subframe to the $(j+g-1)^{th}$ subframe in one data frame, and j and g are positive integers.

The sending, by the first user equipment, at least one occupation signal on the first resource includes:

sending the occupation signal on the $(j+k-1)^{th}$ subframe in the $k^{th}$ data frame in the g data frames, where k is any one of 1, . . . , g, and the occupation signal is used to indicate that a subframe that carries the occupation signal is occupied.

Specifically, as shown in FIG. 6, the first resource includes 4 time-frequency resources that are respectively located in 4 data frames. Each of the time-frequency resources is located in the $1^{st}$ to $4^{th}$ subframes in a data frame corresponding to this time-frequency resource. The occupation signal is sent in the $1^{st}$ subframe of the $1^{st}$ data frame, the $2^{nd}$ subframe of the $2^{nd}$ data frame, the $3^{rd}$ subframe of the $3^{rd}$ data frame, and the $4^{th}$ subframe of the $4^{th}$ data frame separately to indicate occupation of the entire first resource, that is, the time-frequency resource corresponding to shadow areas in the 4 data frames shown in FIG. 6. That is, in this embodiment of the present invention, the occupation signal is sent in different subframe locations in different data frames to indicate occupation of the resource.

The occupation signal is sent on some resources of the selected to-be-occupied first resource to indicate occupation of the first resource, so as to avoid contention for a same resource between different user equipment or between different user groups and save resources for data transmission.

It should be understood that Table 6 gives merely a specific example of the first resource. Correspondingly, the method for sending an occupation signal corresponds to the specific example, which is not limited by this embodiment of the present invention. For example, when the first user equipment intends to occupy time-frequency resource in more data frames, selected to-be-occupied data frames may be divided into N2 data frame sets, each data frame set includes z data frames, where z is a quantity of subframes corresponding to a to-be-occupied time-frequency resource in one data frame, and then the occupation signal is sent on different subframes of different data frames in each data frame set to indicate occupation of the first resource.

Therefore, according to the resource allocation method in this embodiment of the present invention, first user equipment sends an occupation signal on different subframes in different data frames of data frames corresponding to a to-be-occupied first resource to indicate occupation of the first resource, so as to avoid contention for the first resource with user equipment in another user group, improve user experience, and save resources for data transmission.

It should be understood that in this embodiment of the present invention, at least one occupation signal is sent on the selected to-be-occupied first resource, so as to indicate occupation of the first resource. The at least one occupation signal may be multiple occupation signals of a same type, or multiple occupation signals of different types, for example, synchronization signals and synchronization channels, or the first signals and the second signals.

It should further be understood that for ease of understanding and description herein, each embodiment of the present invention is described according to FIG. 3 to FIG. 6. It should further be understood that FIG. 3 to FIG. 6 show specific examples of the embodiment of the present invention, but do not constitute any limitation on the technical solution of the present invention.

It should further be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing has elaborated, with reference to FIG. 1 to FIG. 6, on a resource allocation method according to an embodiment of the present invention from a perspective of first user equipment that sends at least one occupation signal, and the following describes, with reference to FIG. 7, a resource allocation method according to an embodiment of the present invention from a perspective of second user equipment that detects the at least one occupation signal.

As shown in FIG. 7, a resource allocation method 200 according to an embodiment of the present invention may be executed, for example, by second user equipment, where the method 200 includes:

S210. The second user equipment detects at least one occupation signal, where the at least one occupation signal is used to indicate occupation of a first resource.

S220. The second user equipment determines the occupied first resource according to the at least one occupation signal.

Therefore, according to the resource allocation method in this embodiment of the present invention, second user equipment determines, according to a detected occupation signal, a time-frequency resource that first user equipment claims to occupy, so as to effectively avoid resource contention between different user equipment or between different user groups and effectively improve user experience.

Optionally, in this embodiment of the present invention, the detecting, by second user equipment, at least one occupation signal includes:

detecting, by the second user equipment, the occupation signal on each data frame of k data frames, where the occupation signal is used to indicate a time-frequency resource occupied in a data frame that carries the occupation signal, and k is a positive integer; and the determining, by the second user equipment, the occupied first resource according to the at least one occupation signal includes:

determining, by the second user equipment, at least a first time-frequency resource in each data frame of the k data frames that carry the occupation signal as the occupied first resource, where the first time-frequency resource is a time-frequency resource occupied in a data frame and indicated by the occupation signal.

Specifically, as shown in FIG. 3, when the second user equipment separately detects the occupation signal on the $1^{st}$, $6^{th}$, $9^{th}$, $11^{th}$, $16^{th}$, $19^{th}$, and $20^{th}$ data frames shown in FIG. 3, the occupation signal is used to indicate a time-frequency resource occupied in a data frame that carries the occupation signal; and the second user equipment can learn the following time-frequency resource that the first user equipment intends to occupy in the $1^{st}$, $6^{th}$, $9^{th}$, $11^{th}$, $16^{th}$, $19^{th}$, and $20^{th}$ data frames shown in FIG. 3: subframe 0 to subframe 3 in the time domain, and channel 0 and channel 1 in the frequency domain.

Optionally, in this embodiment of the present invention, the determining, by the second user equipment, at least a first time-frequency resource in each data frame of the k data frames that carry the occupation signal as the occupied first resource includes:

determining, by the second user equipment, the first time-frequency resource in each data frame of the following data frames as the occupied first resource: the k data frames that carry the occupation signal, and the $(p \times i)^{th}$ data frame after each data frame of the k data frames, where p is a data frame period, p is a positive integer, i is any one of 1, 2, . . . , g, and g is a positive integer.

Specifically, as shown in FIG. 4, when the second user equipment detects the occupation signal in the $1^{st}$ and $2^{nd}$ data frames, the second user equipment may determine, with reference to system-predefined information, that the time-frequency resource that the first user equipment intends to occupy is the following time-frequency resource in the $1^{st}$, $2^{nd}$, $6^{th}$, $7^{th}$, $7^{th}$, $11^{th}$, $12^{th}$, $16^{th}$, and $17^{th}$ data frames: subframe 0 to subframe 3 in the time domain, and channel 0 and channel 1 in the frequency domain. The second user equipment may also determine, according to a data frame period p indicated by the occupation signal, the resource that the first user equipment intends to occupy. For example, the second user equipment detects the occupation signal on the $1^{st}$ and $2^{nd}$ data frames shown in FIG. 4. In addition to indicating occupation of the time-frequency resource of subframe 0 to subframe 3 in the time domain and channel 0 and channel 1 in the frequency domain, the occupation signal further indicates a data frame period 5. According to the occupation signal, the second user equipment may determine that the first user equipment intends to occupy the following time-frequency resource in the $1^{st}$, $(1+5 \times 1)^{th}$, $(1+5 \times 2)^{th}$, and $(1+5 \times 3)^{th}$ data frames and in the $2^{nd}$, $(2+5 \times 1)^{th}$, $(2+5 \times 2)^{th}$, and $(2+5 \times 3)^{th}$ data frames: subframe 0 to subframe 3 in the time domain, and channel 0 and channel 1 in the frequency domain.

Optionally, in this embodiment of the present invention, the occupation signal is further used to indicate the data frame period p.

Optionally, in this embodiment of the present invention, when the second user equipment determines that the second user equipment and the first user equipment belong to a same user group or a same user cluster, the second user equipment may directly use the first resource indicated by the occupation signal. When determining that the second user equipment does not belong to a user group or user cluster that includes the first user equipment, during data transmission, the second user equipment avoids occupying the first resource indicated by the occupation signal.

Therefore, according to the resource allocation method in this embodiment of the present invention, second user equipment determines, according to a detected occupation signal, a time-frequency resource that first user equipment claims to occupy, so as to effectively avoid resource contention between different user equipment or between different user groups and effectively improve user experience.

Optionally, in this embodiment of the present invention, the at least one occupation signal includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel.

The detecting, by second user equipment, at least one occupation signal includes:

detecting, by the second user equipment, the synchronization signal on each data frame of k data frames, where k is a positive integer; and detecting, by the second user equipment, the synchronization channel on at least the first data frame of data frames that carry the synchronization signal.

The determining, by the second user equipment, the occupied first resource according to the at least one occupation signal includes:

determining, by the second user equipment, at least a first time-frequency resource in each data frame of the k data frames that carry the synchronization signal as the occupied first resource, where the first time-frequency resource is a time-frequency resource occupied in a data frame and indicated by the synchronization channel.

Optionally, in this embodiment of the present invention, the determining, by the second user equipment, at least a first time-frequency resource in each data frame of the k data frames that carry the synchronization signal as the occupied first resource includes:

determining, by the second user equipment, the first time-frequency resource in each data frame of the following data frames as the occupied first resource: the k data frames that carry the synchronization signal, and the $(p \times i)^{th}$ data frame after each data frame of the k data frames, where p is a data frame period, p is a positive integer, i is any one of 1, 2, . . . , g, and g is a positive integer.

Optionally, in this embodiment of the present invention, the synchronization signal is further used to indicate the data frame period p.

Therefore, according to the resource allocation method in this embodiment of the present invention, second user equipment determines, according to a detected occupation signal, a time-frequency resource that first user equipment claims to occupy, so as to effectively avoid resource contention between different user equipment or between different user groups and effectively improve user experience.

Optionally, in this embodiment of the present invention, the at least one occupation signal includes t first signals and s second signals, each of the first signals is used to indicate that a data frame that carries the first signal is occupied, and each of the second signals is used to indicate that a subframe that carries the second signal is occupied, where t and s are positive integers.

The detecting, by second user equipment, at least one occupation signal includes:

detecting, by the second user equipment, the first signal on each data frame of k data frames, where k is a positive integer; and detecting, by the second user equipment, the second signal on each subframe of r subframes in at least the first data frame in the k data frames that carry the first signal, where r is a positive integer.

The determining, by the second user equipment, the occupied first resource according to the at least one occupation signal includes:

determining, by the second user equipment, at least a first time-frequency resource in each data frame of the k data frames that carry the first signal as the occupied first resource, where the first time-frequency resource is a time-frequency resource corresponding to the r subframes that carry the second signals in one data frame.

Optionally, in this embodiment of the present invention, the determining, by the second user equipment, at least a first time-frequency resource in each data frame of the k data frames that carry the first signal as the occupied first resource includes:

determining, by the second user equipment, the first time-frequency resource in each data frame of the following data frames as the occupied first resource: the k data frames that carry the first signal, and the $(p \times i)^{th}$ data frame after each data frame of the k data frames, where p is a data frame period, p is a positive integer, i is any one of 1, 2, . . . , g, and g is a positive integer.

Optionally, in this embodiment of the present invention, the first signal is further used to indicate the data frame period p.

Therefore, according to the resource allocation method in this embodiment of the present invention, second user equipment determines, according to a detected occupation signal, a time-frequency resource that first user equipment claims to occupy, so as to effectively avoid resource contention between different user equipment or between different user groups and effectively improve user experience.

Optionally, in this embodiment of the present invention, the detecting, by second user equipment, at least one occupation signal includes:

detecting, by the second user equipment, the occupation signal on the $(j+k-1)^{th}$ subframe in the $k^{th}$ data frame in g consecutive data frames, where the occupation signal is used to indicate that a subframe that carries the occupation signal is occupied, g and j are positive integers, and k is any one of 1, . . . , g; and the determining, by the second user equipment, the occupied first resource according to the at least one occupation signal includes:

determining, by the second user equipment, at least a first time-frequency resource in each data frame of the g data frames as the occupied first resource, where the first time-frequency resource is a time-frequency resource corresponding to the $j^{th}$ subframe to the $(j+g-1)^{th}$ subframe in one data frame.

Therefore, according to the resource allocation method in this embodiment of the present invention, second user equipment determines, according to a detected occupation signal, a time-frequency resource that first user equipment claims to occupy, so as to effectively avoid resource contention between different user equipment or between different user groups and effectively improve user experience.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 8:
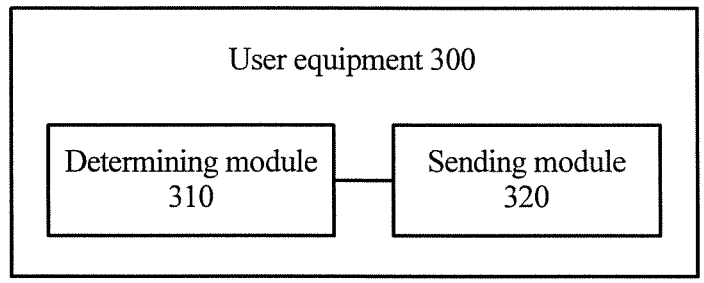
FIG. 8 is a schematic block diagram of user equipment according to an embodiment of the present invention.
Figure 9:
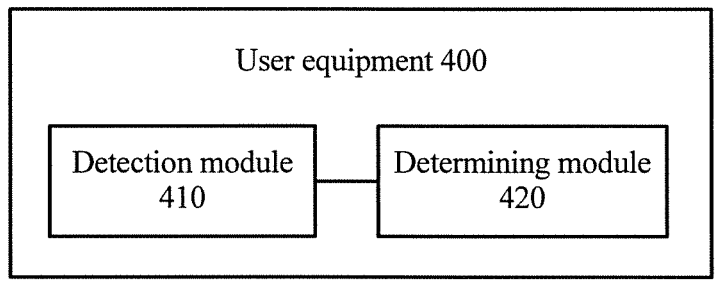
FIG. 9 is a schematic block diagram of another user equipment according to an embodiment of the present invention.

The foregoing has elaborated on a resource allocation method according to an embodiment of the present invention with reference to FIG. 1 to FIG. 7, and the following elaborates on user equipment according to an embodiment of the present invention with reference to FIG. 8 and FIG. 9.

FIG. 8 is a schematic block diagram of user equipment 300 according to an embodiment of the present invention. As shown in FIG. 8, the user equipment 300 includes:

a determining module 310, configured to determine a first resource; and a sending module 320, configured to send at least one occupation signal on the first resource determined by the determining module, where the at least one occupation signal is used to indicate occupation of the first resource.

Therefore, according to the user equipment in this embodiment of the present invention, an occupation signal is sent on a selected to-be-occupied resource to indicate occupation of the resource, so as to effectively avoid resource contention between different user equipments or between different user groups and effectively improve user experience.

Optionally, in this embodiment of the present invention, the first resource determined by the determining module 310 includes n time-frequency resources, the n time-frequency resources are respectively located in n data frames of m data frames, n and m are positive integers, and n is not greater than m.

The sending module 320 is specifically configured to send the occupation signal on each data frame of k data frames of the n data frames, where the occupation signal is used to indicate a time-frequency resource occupied in a data frame that carries the occupation signal, k is a positive integer, and k is not greater than n.

Optionally, in this embodiment of the present invention, the sending module 320 is specifically configured to send the occupation signal on each data frame of k data frames of the n data frames, where k is equal to n.

Optionally, in this embodiment of the present invention, subframe occupation patterns, of the n time-frequency resources included in the first resource determined by the determining module 310, in a data frame corresponding to each of the n time-frequency resources are the same, and the m data frames are divided into f periods according to a same data frame occupation pattern, where k is a quantity of data frames occupied in each period of the f periods, f is a positive integer, and a product of k and f is equal to n.

The sending module 320 is specifically configured to send the occupation signal on each data frame of the k data frames of the n data frames, where the k data frames are k data frames occupied in the first period of the f periods.

Optionally, in this embodiment of the present invention, the occupation signal sent by the sending module 320 is further used to indicate a quantity of data frames included in each period of the f periods.

Optionally, in this embodiment of the present invention, the first resource determined by the determining module 310 includes n time-frequency resources, the n time-frequency resources are respectively located in n data frames of m data frames, n and m are positive integers, n is not greater than m, the at least one occupation signal sent by the sending module includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel, t and s are positive integers, t is less than or equal to n, and s is less than or equal to t.

The sending module 320 is specifically configured to send the synchronization signal on each data frame of t data frames of the n data frames; and send the synchronization channel on at least the first data frame of data frames that carry the synchronization signal.

Optionally, in this embodiment of the present invention, the sending module 320 is specifically configured to send the synchronization signal on each data frame of the t data frames of the n data frames, and send the synchronization channel on each data frame of the data frames that carry the synchronization signal, where t is equal to n.

Optionally, in this embodiment of the present invention, subframe occupation patterns, of the n time-frequency resources determined by the determining module 310, in a data frame corresponding to each of the n time-frequency resources are the same, and the m data frames are divided into f periods according to a same data frame occupation pattern, where t is a quantity of data frames occupied in each period of the f periods, f is a positive integer, and a product of t and f is equal to n.

The sending module 320 is specifically configured to send the synchronization signal on each data frame of the k data frames of the n data frames, where the k data frames are k data frames occupied in the first period of the f periods.

Optionally, in this embodiment of the present invention, the synchronization signal sent by the sending module 320 is further used to indicate a quantity of data frames included in each period of the f periods.

Optionally, in this embodiment of the present invention, the first resource determined by the determining module 310 includes n time-frequency resources, the n time-frequency resources are respectively located in n data frames of m data frames, n and m are positive integers, n is not greater than m, subframe occupation patterns, of the n time-frequency resources, in a data frame corresponding to each of the n time-frequency resources are the same, the subframe occupation pattern corresponds to r subframes in one data frame, the at least one occupation signal includes t first signals and s second signals, each of the first signals is used to indicate that a data frame that carries the first signal is occupied, each of the second signals is used to indicate that a subframe that carries the second signal is occupied, r, t and s are positive integers, and t is less than or equal to n.

The sending module 320 is specifically configured to send the first signal on each data frame of t data frames of the n data frames, and send the second signal on each subframe of the r subframes in at least the first data frame of the data frames that carry the first signal.

Optionally, in this embodiment of the present invention, the sending module 320 is specifically configured to send the first signal on each data frame of the t data frames of the n data frames, where t is equal to n.

Optionally, in this embodiment of the present invention, when the m data frames in which the n data frames determined by the determining module 310 are located are divided into f periods according to a same data frame occupation pattern, t is a quantity of data frames occupied in each period of the f periods, f is a positive integer, and a product of t and f is equal to n.

The sending module 320 is specifically configured to send the first signal on each data frame of the t data frames of the n data frames, where the t data frames are t data frames occupied in the first period of the f periods.

Optionally, in this embodiment of the present invention, the first signal sent by the sending module 320 is further used to indicate a quantity of data frames included in each period of the f periods.

Optionally, in this embodiment of the present invention, the first resource determined by the determining module 310 includes g time-frequency resources that are respectively located in g consecutive data frames, subframe occupation patterns, of the g time-frequency resources, in a data frame corresponding to each of the g time-frequency resources are the same, the subframe occupation pattern corresponds to the $j^{th}$ subframe to the $(j+g-1)^{th}$ subframe in one data frame, and j and g are positive integers.

The sending module 320 is specifically configured to send the occupation signal on the $(j+k-1)^{th}$ subframe in the $k^{th}$ data frame in the g data frames, where k is any one of 1, . . . , g, and the occupation signal is used to indicate that a subframe that carries the occupation signal is occupied.

It should be understood that the user equipment 300 according to this embodiment of the present invention may correspond to the first user equipment in the resource allocation method according to an embodiment of the present invention, and the foregoing and other operations and/or functions of each module in the user equipment 300 are intended to implement corresponding processes of each method in FIG. 1 to FIG. 7. For brevity, details are not described herein.

Therefore, according to the user equipment in this embodiment of the present invention, an occupation signal is sent on a selected to-be-occupied resource to indicate occupation of the resource, so as to effectively avoid resource contention between different user equipments or between different user groups and effectively improve user experience.

The foregoing has elaborated on the user equipment 300 according to an embodiment of the present invention with reference to FIG. 8, and the following elaborates on another user equipment 400 according to an embodiment of the present invention with reference to FIG. 9.

FIG. 9 shows user equipment 400 according to an embodiment of the present invention. The user equipment 400 includes:

a detection module 410, configured to detect at least one occupation signal, where the at least one occupation signal is used to indicate occupation of a first resource; and a determining module 420, configured to determine the occupied first resource according to the at least one occupation signal detected by the detection module.

Therefore, according to the user equipment in this embodiment of the present invention, a time-frequency resource that first user equipment claims to occupy is determined according to a detected occupation signal sent by the first user equipment, so as to effectively avoid resource contention between different user equipment or between different user groups and effectively improve user experience.

Optionally, in this embodiment of the present invention, the detection module 410 is specifically configured to detect the occupation signal on each data frame of k data frames, where the occupation signal is used to indicate a time-frequency resource occupied in a data frame that carries the occupation signal, and k is a positive integer.

The determining module 420 is specifically configured to determine at least a first time-frequency resource in each data frame of the k data frames that carry the occupation signal as the occupied first resource, where the first time-frequency resource is a time-frequency resource occupied in a data frame and indicated by the occupation signal.

Optionally, in this embodiment of the present invention, the determining module 420 is specifically configured to determine the first time-frequency resource in each data frame of the following data frames as the occupied first resource: the k data frames that carry the occupation signal, and the $(p \times i)^{th}$ data frame after each data frame of the k data frames, where p is a data frame period, p is a positive integer, i is any one of 1, 2, . . . , g, and g is a positive integer.

Optionally, in this embodiment of the present invention, the occupation signal detected by the detection module 410 is further used to indicate the data frame period p.

Optionally, in this embodiment of the present invention, the at least one occupation signal includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel.

The detection module 410 is specifically configured to detect the synchronization signal on each data frame of k data frames, and detect the synchronization channel on at least the first data frame of data frames that carry the synchronization signal, where k is a positive integer.

The determining module 420 is specifically configured to determine at least a first time-frequency resource in each data frame of the k data frames that carry the synchronization signal as the occupied first resource, where the first time-frequency resource is a time-frequency resource occupied in a data frame and indicated by the synchronization channel.

Optionally, in this embodiment of the present invention, the determining module 420 is specifically configured to determine the first time-frequency resource in each data frame of the following data frames as the occupied first resource: the k data frames that carry the synchronization signal, and the $(p \times i)^{th}$ data frame after each data frame of the k data frames, where p is a data frame period, p is a positive integer, i is any one of 1, 2, . . . , g, and g is a positive integer.

Optionally, in this embodiment of the present invention, the synchronization signal detected by the detection module 410 is further used to indicate the data frame period p.

Optionally, in this embodiment of the present invention, the at least one occupation signal includes t first signals and s second signals, each of the first signals is used to indicate that a data frame that carries the first signal is occupied, and each of the second signals is used to indicate that a subframe that carries the second signal is occupied, where t and s are positive integers.

The detection module 410 is specifically configured to detect the first signal on each data frame of k data frames, and detect the second signal on each subframe of r subframes in at least the first data frame of the k data frames that carry the first signal, where k and r are positive integers.

The determining module 420 is specifically configured to determine at least a first time-frequency resource in each data frame of the k data frames that carry the first signal as the occupied first resource, where the first time-frequency resource is a time-frequency resource corresponding to the r subframes that carry the second signals in one data frame.

Optionally, in this embodiment of the present invention, the determining module 420 is specifically configured to determine the first time-frequency resource in each data frame of the following data frames as the occupied first resource: the k data frames that carry the first signal, and the $(p \times i)^{th}$ data frame after each data frame of the k data frames, where p is a data frame period, p is a positive integer, i is any one of 1, 2, . . . , g, and g is a positive integer.

Optionally, in this embodiment of the present invention, the first signal detected by the detection module 410 is further used to indicate the data frame period p.

Optionally, in this embodiment of the present invention, the detection module 410 is specifically configured to detect the occupation signal on the $(j+k-1)^{th}$ subframe in the $k^{th}$ data frame in g consecutive data frames, where the occupation signal is used to indicate that a subframe that carries the occupation signal is occupied, g and j are positive integers, and k is any one of 1, . . . , g.

The determining module 420 is specifically configured to determine at least a first time-frequency resource in each data frame of the g data frames as the occupied first resource, where the first time-frequency resource is a time-frequency resource corresponding to the $j^{th}$ subframe to the $(j+g-1)^{th}$ subframe in one data frame.

It should be understood that the user equipment 400 according to this embodiment of the present invention may correspond to the second user equipment in the resource allocation method according to an embodiment of the present invention, and the foregoing and other operations and/or functions of each module in the user equipment 400 are intended to implement corresponding processes of each method in FIG. 1 to FIG. 7. For brevity, details are not described herein.

Therefore, according to the user equipment in this embodiment of the present invention, a time-frequency resource that first user equipment claims to occupy is determined according to a detected occupation signal sent by the first user equipment, so as to effectively avoid resource contention between different user equipment or between different user groups and effectively improve user experience.

Figure 10:
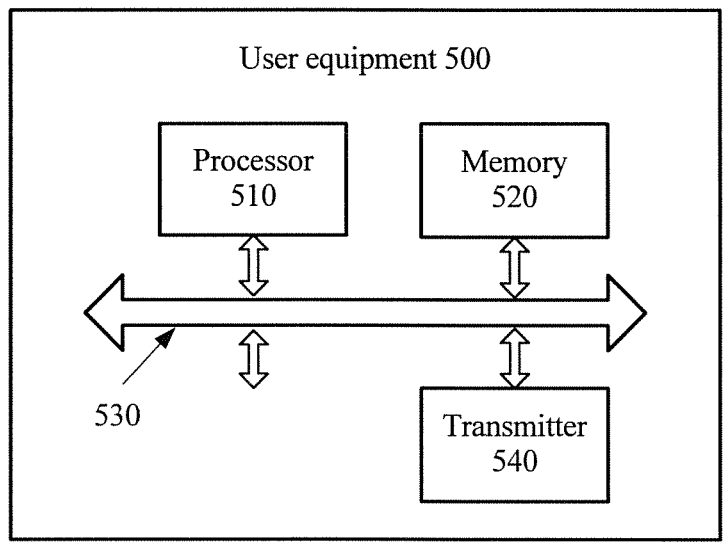
FIG. 10 is a schematic block diagram of user equipment according to another embodiment of the present invention.

As shown in FIG. 10, an embodiment of the present invention further provides user equipment 500, where the user equipment 500 includes a processor 510, a memory 520, a bus system 530, and a transmitter 540. The processor 510, the memory 520, and the transmitter 540 are connected by using the bus system 530, the memory 520 is configured to store instructions, and the processor 510 is configured to execute the instructions stored in the memory 520, so as to control the transmitter 540 to send a signal. The processor 510 is configured to determine a first resource, and the transmitter 540 is configured to send at least one occupation signal on the first resource, where the at least one occupation signal is used to indicate occupation of the first resource.

Therefore, according to the user equipment in this embodiment of the present invention, an occupation signal is sent on a selected to-be-occupied resource to indicate occupation of the resource, so as to effectively avoid resource contention between different user equipment or between different user groups and effectively improve user experience.

It should be understood that in this embodiment of the present invention, the processor 510 may be a central processing unit (English: Central Processing Unit, CPU for short), or the processor 510 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor and the like.

The memory 520 may include a read-only memory and a random access memory, and provides an instruction and data to the processor 510. A part of the memory 520 may further include a non-volatile random access memory. For example, the memory 520 may further store device type information.

The bus system 530 may include a power bus, a control bus, a status signal bus, and the like in addition to a data bus. However, for clear description, various types of buses in the figure are marked as the bus system 530.

In an implementation process, the steps of the method may be implemented by an integrated logical circuit of hardware in the processor 510, or by a software instruction. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 520, and the processor 510 reads information in the memory 520 and completes the steps in the foregoing methods in combination with hardware of the processor 510. To avoid repetition, details are not described herein.

Optionally, in an embodiment, the first resource determined by the processor 510 includes n time-frequency resources, the n time-frequency resources are respectively located in n data frames of m data frames, n and m are positive integers, and n is not greater than m.

The transmitter 540 is specifically configured to send the occupation signal on each data frame of k data frames of the n data frames, where the occupation signal is used to indicate a time-frequency resource occupied in a data frame that carries the occupation signal, k is a positive integer, and k is not greater than n.

Optionally, in an embodiment, the transmitter 540 is specifically configured to send the occupation signal on each data frame of k data frames of the n data frames, where k is equal to n.

Optionally, in an embodiment, subframe occupation patterns, of the n time-frequency resources included in the first resource determined by the processor 510, in a data frame corresponding to each of the n time-frequency resources are the same, and the m data frames are divided into f periods according to a same data frame occupation pattern, where k is a quantity of data frames occupied in each period of the f periods, f is a positive integer, and a product of k and f is equal to n. The transmitter 540 is specifically configured to send the occupation signal on each data frame of k data frames of the n data frames, where the k data frames are k data frames occupied in the first period of the f periods.

Optionally, in an embodiment, the occupation signal sent by the transmitter 540 is further used to indicate a quantity of data frames included in each period of the f periods.

Optionally, in an embodiment, the first resource determined by the processor 510 includes n time-frequency resources, the n time-frequency resources are respectively located in n data frames of m data frames, n and m are positive integers, n is not greater than m, the at least one occupation signal sent by the transmitter 540 includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel, t and s are positive integers, t is less than or equal to n, and s is less than or equal to t. The transmitter 540 is specifically configured to send the synchronization signal on each data frame of t data frames of the n data frames. The transmitter 540 is specifically configured to send the synchronization channel on at least the first data frame of data frames that carry the synchronization signal.

Optionally, in an embodiment, the transmitter 540 is specifically configured to send the synchronization signal on each data frame of the t data frames of the n data frames, and send the synchronization channel on each data frame of the data frames that carry the synchronization signal, where t is equal to n.

Optionally, in an embodiment, subframe occupation patterns, of the n time-frequency resources determined by the processor 510, in a data frame corresponding to each of the n time-frequency resources are the same, and the m data frames are divided into f periods according to a same data frame occupation pattern, where t is a quantity of data frames occupied in each period of the f periods, f is a positive integer, and a product of t and f is equal to n; and the transmitter 540 is specifically configured to send the synchronization signal on each data frame of the k data frames of the n data frames, where the k data frames are k data frames occupied in the first period of the f periods.

Optionally, in an embodiment, the synchronization signal sent by the transmitter 540 is further used to indicate a quantity of data frames included in each period of the f periods.

Optionally, in an embodiment, the first resource determined by the processor 510 includes n time-frequency resources, the n time-frequency resources are respectively located in n data frames of m data frames, n and m are positive integers, n is not greater than m, subframe occupation patterns, of the n time-frequency resources, in a data frame corresponding to each of the n time-frequency resources are the same, the subframe occupation pattern corresponds to r subframes in one data frame, the at least one occupation signal includes t first signals and s second signals, each of the first signals is used to indicate that a data frame that carries the first signal is occupied, each of the second signals is used to indicate that a subframe that carries the second signal is occupied, r, t and s are positive integers, n is not greater than m, and t is less than or equal to n. The transmitter 540 is specifically configured to send the first signal on each data frame of t data frames of the n data frames; and send the second signal on each subframe of the r subframes in at least the first data frame of data frames that carry the first signal.

Optionally, in an embodiment, the transmitter 540 is specifically configured to send the first signal on each data frame of the t data frames of the n data frames, where t is equal to n.

Optionally, in an embodiment, when the m data frames in which the n data frames determined by the processor 510 are located are divided into f periods according to a same data frame occupation pattern, t is a quantity of data frames occupied in each period of the f periods, f is a positive integer, and a product of t and f is equal to n.

The transmitter 540 is specifically configured to send the first signal on each data frame of the t data frames of the n data frames, where the t data frames are t data frames occupied in the first period of the f periods.

Optionally, in an embodiment, the first signal sent by the transmitter 540 is further used to indicate a quantity of data frames included in each period of the f periods.

Optionally, in an embodiment, the first resource determined by the processor 510 includes g time-frequency resources that are respectively located in g consecutive data frames, subframe occupation patterns, of the g time-frequency resources, in a data frame corresponding to each of the g time-frequency resources are the same, the subframe occupation pattern corresponds to the $j^{th}$ subframe to the $(j+g-1)^{th}$ subframe in one data frame, and j and g are positive integers. The transmitter 540 is specifically configured to send the occupation signal on the $(j+k-1)^{th}$ subframe in the $k^{th}$ data frame in the g data frames, where k is any one of 1, . . . , g, and the occupation signal is used to indicate that a subframe that carries the occupation signal is occupied.

It should be understood that the user equipment 500 according to this embodiment of the present invention may correspond to the first user equipment in the resource allocation method according to an embodiment of the present invention, or may correspond to the user equipment 300 according to an embodiment of the present invention, and the foregoing and other operations and/or functions of each module in the user equipment 500 are intended to implement corresponding processes of each method in FIG. 1 to FIG. 7. For brevity, details are not described herein.

Therefore, according to the user equipment in this embodiment of the present invention, an occupation signal is sent on a selected to-be-occupied resource to indicate occupation of the resource, so as to effectively avoid resource contention between different user equipment or between different user groups and effectively improve user experience.

Figure 11:
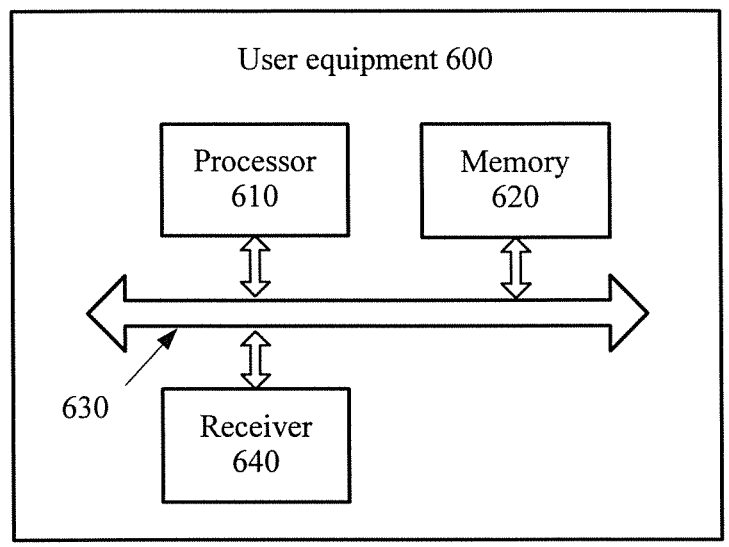
FIG. 11 is a schematic block diagram of another user equipment according to another embodiment of the present invention.

As shown in FIG. 11, an embodiment of the present invention further provides user equipment 600, where the user equipment 600 includes a processor 610, a memory 620, a bus system 630, and a receiver 640. The processor 610, the memory 620, and the receiver 640 are connected by using the bus system 630, the memory 620 is configured to store instructions, and the processor 610 is configured to execute the instructions stored in the memory 620, so as to control the receiver 640 to receive a signal. The receiver 640 is configured to detect at least one occupation signal, where the at least one occupation signal is used to indicate occupation of a first resource. The processor 610 is configured to determine the occupied first resource according to the at least one occupation signal detected by the receiver 640.

Therefore, according to the user equipment in this embodiment of the present invention, a time-frequency resource that first user equipment claims to occupy is determined according to a detected occupation signal sent by the first user equipment, so as to effectively avoid resource contention between different user equipment or between different user groups and effectively improve user experience.

It should be understood that in this embodiment of the present invention, the processor 610 may be a central processing unit (English: Central Processing Unit, CPU for short), or the processor 610 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor and the like.

The memory 620 may include a read-only memory and a random access memory, and provides an instruction and data to the processor 610. A part of the memory 620 may further include a non-volatile random access memory. For example, the memory 620 may further store device type information.

The bus system 630 may include a power bus, a control bus, a status signal bus, and the like in addition to a data bus. However, for clear description, various types of buses in the figure are marked as the bus system 630.

In an implementation process, the steps of the method may be implemented by an integrated logical circuit of hardware in the processor 610, or by a software instruction. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 620, and the processor 610 reads information in the memory 620 and completes the steps in the foregoing methods in combination with hardware of the processor 610. To avoid repetition, details are not described herein.

Optionally, in an embodiment, the receiver 640 is specifically configured to detect the occupation signal on each data frame of k data frames, where the occupation signal is used to indicate a time-frequency resource occupied in a data frame that carries the occupation signal, and k is a positive integer. The processor 610 is specifically configured to determine at least a first time-frequency resource in each data frame of the k data frames that carry the occupation signal as the occupied first resource, where the first time-frequency resource is a time-frequency resource occupied in a data frame and indicated by the occupation signal.

Optionally, in an embodiment, the processor 610 is specifically configured to determine the first time-frequency resource in each data frame of the following data frames as the occupied first resource: the k data frames that carry the occupation signal, and the $(p \times i)^{th}$ data frame after each data frame of the k data frames, where p is a data frame period, p is a positive integer, i is any one of 1, 2, . . . , g, and g is a positive integer.

Optionally, in an embodiment, the occupation signal detected by the receiver 640 is further used to indicate the data frame period p.

Optionally, in an embodiment, the at least one occupation signal includes t synchronization signals and s synchronization channels, the synchronization signals is used to indicate that a data frame that carries the synchronization signal is occupied, the synchronization channels is used to indicate a time-frequency resource occupied in a data frame that carries the synchronization channel. The receiver 640 is specifically configured to detect the synchronization signal on each data frame of k data frames, where k is a positive integer; and the receiver 640 is specifically configured to detect the synchronization channel on at least the first data frame of data frames that carry the synchronization signal. The processor 610 is specifically configured to determine at least a first time-frequency resource in each data frame of the k data frames that carry the synchronization signal as the occupied first resource, where the first time-frequency resource is a time-frequency resource occupied in a data frame and indicated by the synchronization channel.

Optionally, in an embodiment, the processor 610 is specifically configured to determine the first time-frequency resource in each data frame of the following data frames as the occupied first resource: the k data frames that carry the synchronization signal, and the $(p \times i)^{th}$ data frame after each data frame of the k data frames, where p is a data frame period, p is a positive integer, i is any one of 1, 2, . . . , g, and g is a positive integer.

Optionally, in an embodiment, the synchronization signal detected by the receiver 640 is further used to indicate the data frame period p.

Optionally, in an embodiment, the at least one occupation signal includes t first signals and s second signals, each of the first signals is used to indicate that a data frame that carries the first signal is occupied, and each of the second signals is used to indicate that a subframe that carries the second signal is occupied, where t and s are positive integers. The receiver 640 is specifically configured to detect the first signal on each data frame of k data frames. The receiver 640 is specifically configured to detect the second signal on each subframe of r subframes in at least the first data frame in the k data frames that carry the first signal, where r is a positive integer. The processor 610 is specifically configured to determine at least a first time-frequency resource in each data frame of the k data frames that carry the first signal as the occupied first resource, where the first time-frequency resource is a time-frequency resource corresponding to the r subframes that carry the second signals in one data frame.

Optionally, in an embodiment, the processor 610 is specifically configured to determine the first time-frequency resource in each data frame of the following data frames as the occupied first resource: the k data frames that carry the first signal, and the $(p \times i)^{th}$ data frame after each data frame of the k data frames, where p is a data frame period, p is a positive integer, i is any one of 1, 2, ..., g, and g is a positive integer.

Optionally, in an embodiment, the first signal detected by the receiver 640 is further used to indicate the data frame period p.

Optionally, in an embodiment, the receiver 640 is specifically configured to detect the occupation signal on the $(j+k-1)^{th}$ subframe in the $k^{th}$ data frame in g consecutive data frames, where the occupation signal is used to indicate that a subframe that carries the occupation signal is occupied, g and j are positive integers, and k is any one of 1, ..., g.

The processor 610 is specifically configured to determining at least a first time-frequency resource in each data frame of the g data frames as the occupied first resource, where the first time-frequency resource is a time-frequency resource corresponding to the $j^{th}$ subframe to the $(j+g-1)^{th}$ subframe in one data frame.

It should be understood that the user equipment 600 according to this embodiment of the present invention may correspond to the second user equipment in the resource allocation method according to an embodiment of the present invention, or may correspond to the user equipment 400 according to an embodiment of the present invention, and the foregoing and other operations and/or functions of each module in the user equipment 600 are intended to implement corresponding processes of each method in FIG. 1 to FIG. 7. For brevity, details are not described herein.

Therefore, according to the user equipment in this embodiment of the present invention, a time-frequency resource that first user equipment claims to occupy is determined according to a detected occupation signal sent by the first user equipment, so as to effectively avoid resource contention between different user equipment or between different user groups and effectively improve user experience.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined only according to A, and B may also be determined according to A and/or other information.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource allocation method, comprising:
   determining, by a first user equipment, a first resource, wherein the first resource comprises n time-frequency resources respectively located in n data frames of m data frames, n and m are positive integers, and n is not greater than m;
   sending, by the first user equipment, at least one occupation signal on the first resource for indicating occupation of the first resource, comprising:
      sending, by the first user equipment, the occupation signal on each data frame of k data frames of the n data frames for indicating a time-frequency resource occupied in a data frame that carries the occupation signal, k is a positive integer, and k is not greater than n;
   when subframe occupation patterns of the n time-frequency resources in a data frame corresponding to each of the n time-frequency resources are the same, and when the m data frames are divided into f periods according to a same data frame occupation pattern, k is a quantity of data frames occupied in each period of the f periods, wherein f is a positive integer and a product of k and f is equal to n; and
   wherein sending, by the first user equipment, the occupation signal on each data frame of k data frames of the n data frames comprises:
      sending, by the first user equipment, the occupation signal on each data frame of the k data frames occupied in the first period of the f periods.

2. A resource allocation method, comprising:
   determining, by a first user equipment, a first resource, wherein the first resource comprises n time-frequency resources respectively located in n data frames of m data frames, n and m are positive integers, n is not greater than m, the at least one occupation signal comprises t synchronization signals for indicating that a data frame that carries the synchronization signal is occupied and s synchronization channels for indicating a time-frequency resource occupied in a data frame that carries the synchronization channel, t and s are positive integers, t is less than or equal to n, and s is less than or equal to t; and
   sending, by the first user equipment, at least one occupation signal on the first resource for indicating occupation of the first resource, comprising:
      sending, by the first user equipment, the synchronization signal on each data frame of t data frames of the n data frames, and
      sending, by the first user equipment, the synchronization channel on at least the first data frame of data frames that carry the synchronization signal.

3. The method according to claim 2, wherein:
   when subframe occupation patterns of the n time-frequency resources in a data frame corresponding to each of the n time-frequency resources are the same, and when the m data frames are divided into f periods according to a same data frame occupation pattern, t is a quantity of data frames occupied in each period of the f periods, wherein f is a positive integer and a product of t and f is equal to n; and
   sending, by the first user equipment, the synchronization signal on each data frame of t data frames of the n data frames comprises:
      sending, by the first user equipment, the synchronization signal on each data frame of the t data frames occupied in the first period of the f periods.

4. A resource allocation method, comprising:
   determining, by a first user equipment, a first resource, wherein the first resource comprises n time-frequency resources respectively located in n data frames of m data frames, n and m are positive integers, n is not greater than m, subframe occupation patterns of the n time-frequency resources in a data frame corresponding to each of the n time-frequency resources are the same, the subframe occupation pattern corresponds to r subframes in one data frame; and
   sending, by the first user equipment, at least one occupation signal on the first resource for indicating occupation of the first resource, wherein the at least one occupation signal comprises t first signals and s second signals, each of the first signals for indicating that a data frame that carries the first signal is occupied, each of the second signals for indicating that a subframe that carries the second signal is occupied, r, t and s are positive integers, and t is less than or equal to n, comprising:
      sending, by the first user equipment, the first signal on each data frame of t data frames of the n data frames, and
      sending, by the first user equipment, the second signal on each subframe of the r subframes in at least the first data frame of data frames that carry the first signal.

5. The method according to claim 4, wherein:
   when the m data frames are divided into f periods according to a same data frame occupation pattern, t is a quantity of data frames occupied in each period of the f periods, wherein f is a positive integer and a product of t and f is equal to n; and
   sending, by the first user equipment, the first signal on each data frame of t data frames of the n data frames comprises:
      sending, by the first user equipment, the first signal on each data frame of the t data frames occupied in the first period of the f periods.

6. A resource allocation method, comprising:
   determining, by a first user equipment, a first resource, wherein the first resource comprises g time-frequency resources that are respectively located in g consecutive data frames, subframe occupation patterns, of the g time-frequency resources, in a data frame corresponding to each of the g time-frequency resources are the same, the subframe occupation pattern corresponds to the $j^{th}$ to the $(j+g-1)^{th}$ subframe in one data frame, and j and g are positive integers; and sending, by the first user equipment, at least one occupation signal on the first resource for indicating occupation of the first resource, comprising:

sending the occupation signal on the $(j+k-1)^{th}$ subframe in the $k^{th}$ data frame in the g data frames, wherein k is any one of 1, . . . , g, for indicating that a subframe that carries the occupation signal is occupied.

7. A resource allocation method, comprising:

detecting, by a second user equipment, at least one occupation signal for indicating occupation of a first resource, wherein the at least one occupation signal comprises t synchronization signals for indicating that a data frame that carries the synchronization signal is occupied and s synchronization channels for indicating a time-frequency resource occupied in a data frame that carries the synchronization channel, wherein t and s are positive integers, comprising:

detecting, by the second user equipment, the synchronization signal on each data frame of k data frames, wherein k is a positive integer, and detecting, by the second user equipment, the synchronization channel on at least the first data frame of data frames that carry the synchronization signal; and determining, by the second user equipment, the occupied first resource according to the at least one occupation signal, comprising:

determining, by the second user equipment, at least a first time-frequency resource in each data frame of the k data frames that carry the synchronization signal as the occupied first resource, wherein the first time-frequency resource is a time-frequency resource occupied in a data frame and indicated by the synchronization channel.

8. The method according to claim 7, wherein:

detecting, by the second user equipment, at least one occupation signal comprises:

detecting, by the second user equipment, the occupation signal on each data frame of the k data frames for indicating a time-frequency resource occupied in a data frame that carries the occupation signal; and determining, by the second user equipment, the occupied first resource according to the at least one occupation signal comprises:

determining, by the second user equipment, at least a first time-frequency resource in each data frame of the k data frames that carry the occupation signal as the occupied first resource, wherein the first time-frequency resource is a time-frequency resource occupied in a data frame and indicated by the occupation signal.

9. A resource allocation method, comprising:

detecting, by a second user equipment, at least one occupation signal for indicating occupation of a first resource, wherein the at least one occupation signal comprises t first signals and s second signals, each of the first signals for indicating that a data frame that carries the first signal is occupied, and each of the second signals for indicating that a subframe that carries the second signal is occupied, wherein t and s are positive integers, comprising:

detecting, by the second user equipment, the first signal on each data frame of k data frames, wherein k is a positive integer, and detecting, by the second user equipment, the second signal on each subframe of r subframes in at least the first data frame in the k data frames that carry the first signal, wherein r is a positive integer; and determining, by the second user equipment, the occupied first resource according to the at least one occupation signal, comprising:

determining, by the second user equipment, at least a first time-frequency resource in each data frame of the k data frames that carry the first signal as the occupied first resource, wherein the first time-frequency resource is a time-frequency resource corresponding to the r subframes that carry the second signals in one data frame.

10. A resource allocation method, comprising:

detecting, by a second user equipment, at least one occupation signal for indicating occupation of a first resource, comprising:

detecting, by the second user equipment, the occupation signal on the $(j+k-1)^{th}$ subframe in the $k^{th}$ data frame in g consecutive data frames for indicating that a subframe that carries the occupation signal is occupied, g and j are positive integers, and k is any one of 1, . . . , g; and determining, by the second user equipment, the occupied first resource according to the at least one occupation signal, comprising:

determining, by the second user equipment, at least a first time-frequency resource in each data frame of the g data frames as the occupied first resource, wherein the first time-frequency resource is a time-frequency resource corresponding to the $j^{th}$ subframe to the $(j+g-1)^{th}$ subframe in one data frame.

11. User equipment, comprising:

a processor;

memory coupled to the processor, the memory comprising instructions that, when executed by the processor, cause the user equipment to:

determine a first resource, the first resource comprising n time-frequency resources respectively located in n data frames of m data frames, wherein n and m are positive integers, and n is not greater than m, send at least one occupation signal on the first resource for indicating occupation of the first resource, wherein the at least one occupation signal comprises t synchronization signals for indicating that a data frame that carries the synchronization signal is occupied and s synchronization channels for indicating a time-frequency resource occupied in a data frame that carries the synchronization channel, wherein t and s are positive integers, t is less than or equal to n, and s is less than or equal to t, and send the synchronization signal on each data frame of t data frames of the n data frames, and send the synchronization channel on at least the first data frame of the data frames that carry the synchronization signal.

12. The user equipment according to claim 11, wherein the instructions, when executed by the processor, cause the user equipment to:

send the occupation signal on each data frame of k data frames of the n data frames for indicating a time-frequency resource occupied in a data frame that carries the occupation signal, wherein k is a positive integer, and k is not greater than n.

13. User equipment, comprising:

a processor;

memory coupled to the processor, the memory comprising instructions that, when executed by the processor, cause the user equipment to:

determine a first resource, the first resource comprising n time-frequency resources respectively located in n data frames of m data frames, wherein n and m are positive integers, and n is not greater than m, wherein subframe occupation patterns of the n time-frequency resources in a data frame corresponding to each of the n time-frequency resources are the same, and the m data frames are divided into f periods according to a same data frame occupation pattern, wherein t is a quantity of data frames occupied in each period of the f periods, f is a positive integer, and a product of t and f is equal to n, send a synchronization signal on each data frame of the t data frames of the n data frames, wherein the t data frames are t data frames occupied in the first period of the f periods, and send at least one occupation signal on the first resource for indicating occupation of the first resource.

14. User equipment, comprising:

a processor;

memory coupled to the processor, the memory comprising instructions that, when executed by the processor, cause the user equipment to:

determine a first resource, wherein the first resource comprises n time-frequency resources respectively located in n data frames of m data frames, n and m are positive integers, n is not greater than m, subframe occupation patterns of the n time-frequency resources in a data frame corresponding to each of the n time-frequency resources are the same, the subframe occupation pattern corresponds to r subframes in one data frame, send at least one occupation signal on the first resource for indicating occupation of the first resource, wherein the at least one occupation signal comprises t first and s second signals, each of the first signals for indicating that a data frame that carries the first signal is occupied, each of the second signals for indicating that a subframe that carries the second signal is occupied, r, t, and s are positive integers, and t is less than or equal to n, and send the first signal on each data frame of t data frames of the n data frames, and send the second signal on each subframe of the r subframes in at least the first data frame of the data frames that carry the first signal.

15. The user equipment according to claim 14, wherein:

when the m data frames in which the n data frames are located are divided into f periods according to a same data frame occupation pattern, t is a quantity of data frames occupied in each period of the f periods, f is a positive integer, and a product of t and f is equal to n; and the instructions, when executed by the processor, cause the user equipment to send the first signal on each data frame of the t data frames of the n data frames, wherein the t data frames are t data frames occupied in the first period of the f periods.

16. User equipment, comprising:

a processor;

memory coupled to the processor, the memory comprising instructions that, when executed by the processor, cause the user equipment to:

determine a first resource, wherein the first resource comprises g time-frequency resources that are respectively located in g consecutive data frames, subframe occupation patterns of the g time-frequency resources in a data frame corresponding to each of the g time-frequency resources are the same, the subframe occupation pattern corresponds to the $j^{th}$ subframe to the $(j+g-1)^{th}$ subframe in one data frame, and j and g are positive integers, send at least one occupation signal on the first resource for indicating occupation of the first resource, and send the occupation signal on the $(j+k-1)^{th}$ subframe in the $k^{th}$ data frame in the g data frames, wherein k is 1, ..., g, the occupation signal for indicating that a subframe that carries the occupation signal is occupied.

* * * * *